US012607820B2

(12) United States Patent
Zhuang et al.

(10) Patent No.: US 12,607,820 B2
(45) Date of Patent: Apr. 21, 2026

(54) OPTICAL ELEMENT DRIVING MECHANISM

(71) Applicant: Actutek Corporation, Taoyuan City (TW)

(72) Inventors: Po-Xiang Zhuang, Taoyuan City (TW); Chen-Hung Chao, Taoyuan City (TW); Wei-Jhe Shen, Taoyuan City (TW); Shou-Jen Liu, Taoyuan City (TW); Kun-Shih Lin, Taoyuan City (TW); Yi-Ho Chen, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 263 days.

(21) Appl. No.: 18/462,679

(22) Filed: Sep. 7, 2023

(65) Prior Publication Data

US 2024/0077744 A1 Mar. 7, 2024

Related U.S. Application Data

(60) Provisional application No. 63/404,398, filed on Sep. 7, 2022.

(51) Int. Cl.
| | |
|---|---|
| *G02B 7/08* | (2021.01) |
| *G02B 5/00* | (2006.01) |
| *G02B 7/09* | (2021.01) |
| *G02B 13/00* | (2006.01) |
| *G02B 27/64* | (2006.01) |

(52) U.S. Cl.
CPC ............... *G02B 7/08* (2013.01); *G02B 5/005* (2013.01); *G02B 7/09* (2013.01); *G02B 13/001* (2013.01); *G02B 27/646* (2013.01)

(58) Field of Classification Search
CPC . G02B 7/08; G02B 5/005; G02B 7/09; G02B 13/001; G02B 27/646; H02K 41/00; H02K 41/0354
See application file for complete search history.

(56) References Cited

U.S. PATENT DOCUMENTS

| | | | | |
|---|---|---|---|---|
| 2013/0258506 A1* | 10/2013 | Lee | ........................... | G02B 7/08 |
| | | | | 359/824 |
| 2020/0041756 A1* | 2/2020 | Kao | ..................... | G02B 27/646 |

FOREIGN PATENT DOCUMENTS

CN 114527549 A 5/2022

OTHER PUBLICATIONS

Office Action issued in corresponding CN application No. 202322180660.X dated Feb. 9, 2024 (1 page).

* cited by examiner

*Primary Examiner* — Nathanael R Briggs
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion used for connecting an optical element, a fixed portion, and a driving assembly used for driving the movable portion to move relative to the fixed portion. The movable portion is movable relative to the fixed portion.

19 Claims, 26 Drawing Sheets

1200

1000

1000

1110 ⎫
1120 ⎬ 1100

1110

1200

1340 ⎫
1320 ⎪
1310 ⎬ 1300
1330 ⎭

1502 ⎫
1501 ⎬ 1500

1120

1400

1900

Z
X   Y

1200

1200

1200

1224

1221

1225

1941

1220

1200

1200

1120

1121

1146

1145

1144

1122

1003

OPTICAL ELEMENT DRIVING MECHANISM

CROSS REFERENCE TO RELATED APPLICATIONS

This application claims priority of U.S. Provisional Application No. 63/404,398, filed on Sep. 7, 2022, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism is provided. The optical element driving mechanism includes a movable portion used for connecting an optical element, a fixed portion, and a driving assembly used for driving the movable portion to move relative to the fixed portion. The movable portion is movable relative to the fixed portion.

In some embodiments, the optical element driving mechanism further includes a guiding assembly used for guiding a moving direction of the movable portion relative to the fixed portion. The guiding assembly includes a first guiding element and a second guiding element disposed on the fixed portion. The fixed portion includes a case and a bottom. The case and the bottom are arranged along a main axis. The main axis extends in a first direction. The bottom includes a first recess, a second recess, a first opening, and a second opening. The first guiding element is at least partially disposed in the first recess. The second guiding element is at least partially disposed in the second recess. The first guiding element passes through the first opening. The second guiding element passes through the second opening.

In some embodiments, the first guiding element is exposed from the bottom when viewed from the first direction. The second guiding element is exposed from the bottom when viewed from the first direction. The first guiding element is not exposed from the case when viewed from the first direction. The second guiding element is not exposed from the case when viewed from the first direction.

In some embodiments, a second direction is opposite from the first direction. The first guiding element is exposed from the bottom when viewed from the second direction. The second guiding element is exposed from the bottom when viewed from the second direction.

In some embodiments, the first recess includes a first recess disposing portion and a first recess gap. The first recess gap is disposed in the first recess disposing portion. The first guiding element is at least partially disposed in the first recess disposing portion.

The first guiding element is not disposed in the first recess gap.

In some embodiments, the second recess includes a second recess disposing portion and a second recess gap. The second recess gap is disposed in the second recess disposing portion. The second guiding element is at least partially disposed in the second recess disposing portion. The second guiding element is not disposed in the second recess gap.

In some embodiments, the first guiding element and the second guiding element are disposed on a virtual plane. The virtual plane is parallel to the main axis. The first recess and the second recess are disposed on opposite sides of the virtual plane when viewed along the main axis.

In some embodiments, the movable portion includes a movable portion main body, a first guiding recess, and a second guiding recess. The first guiding recess and the second guiding recess are formed on the movable portion main body. The first guiding element is disposed in the first guiding recess. The second guiding element is disposed in the second guiding recess. The first guiding recess and the second guiding recess are disposed on opposite sides of the virtual plane.

In some embodiments, the first guiding recess has a first segment and a second segment extending in different directions when viewed along the main axis. The second guiding recess has a third segment and a fourth segment extending in different directions when viewed along the main axis. The first guiding recess has a first width in a direction that the fourth segment extends. The first guiding recess has a second width in the direction that the fourth segment extends. In some embodiments, the first width and the second width are different.

In some embodiments, a concave portion is formed in the first guiding recess. A convex portion is formed in the second guiding recess. The concave portion has a first length along the main axis. The convex portion has a second length along the main axis. The first length and the second length are different.

In some embodiments, the concave portion is not exposed from the first guiding recess when viewed along the main axis. The convex portion is exposed from the second guiding recess when viewed along the main axis.

In some embodiments, the first guiding recess includes a first leaning surface and a second leaning surface. The concave portion is between the first leaning surface and the second leaning surface. The first guiding element is in direct contact with the first leaning surface and the second leaning surface. The second guiding element is in contact with the convex portion.

In some embodiments, the movable portion further includes a first stopping portion, a second stopping portion, a third stopping portion, a fourth stopping portion, and a fifth stopping portion. The first stopping portion extends from the movable portion main body to the case in the second direction. The second stopping portion extends from the movable portion main body to the case in the second direction. The third stopping portion extends from the movable portion main body to the case in the second direction. The fourth stopping portion extends from the movable portion main body to the case in the second direction. The fifth stopping portion extends from the movable portion main body to the bottom in the second direction.

In some embodiments, a first minimum distance is between the first stopping portion and the case in the first direction. A second minimum distance is between the fifth stopping portion and the bottom in the first direction. A sum of the first minimum distance and the second minimum distance is a movable range. In some embodiments, the movable range is greater than the second length. The movable range is less than 2 times of the second length.

In some embodiments, the first stopping portion has a first thickness in the main axis. The fifth stopping portion has a second thickness in the main axis. The first thickness is greater than 0.5 mm. The second thickness is greater than 0.5 mm. The first thickness is less than the movable range. In some embodiments, the second thickness is less than the movable range.

In some embodiments, the second width is greater than the first width. The first length is greater than the second length. The first stopping portion, the second stopping portion, the third stopping portion, and the fourth stopping portion are arranged relative to a center in a counterclockwise manner when viewed along the main axis, and the center is a point passed through by the main axis. The first stopping portion and the third stopping portion are rotational symmetrical relative to the center. In some embodiments, the second stopping portion and the fourth stopping portion are rotational symmetrical relative to the center.

In some embodiments, the first stopping portion and the second stopping portion have different shapes. The first stopping portion and the fourth stopping portion have different shapes. The third stopping portion and the second stopping portion have different shapes. The third stopping portion and the fourth stopping portion have different shapes.

In some embodiments, a distance between the first stopping portion and the first guiding element is less than a distance between the second stopping portion and the first guiding element when viewed along the main axis. The distance between the first stopping portion and the first guiding element is less than a distance between the fourth stopping portion and the first guiding element when viewed along the main axis. A distance between the third stopping portion and the second guiding element is less than a distance between the second stopping portion and the second guiding element when viewed along the main axis. The distance between the third stopping portion and the second guiding element is less than a distance between the fourth stopping portion and the second guiding element when viewed along the main axis.

In some embodiments, the optical element driving mechanism further includes a temperature sensor and a position sensor. The temperature sensor is disposed on the fixed portion. The temperature sensor is adjacent to the first guiding element or the second guiding element to detect temperature of the first guiding element or the second guiding element. The position sensor is disposed in a second driving coil and corresponds to a second magnetic element.

In some embodiments, the optical element driving mechanism further includes a first guiding element and a second guiding element disposed on the movable portion. The first guiding element is movably connected to the fixed portion. The second guiding element is movably connected to the fixed portion.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
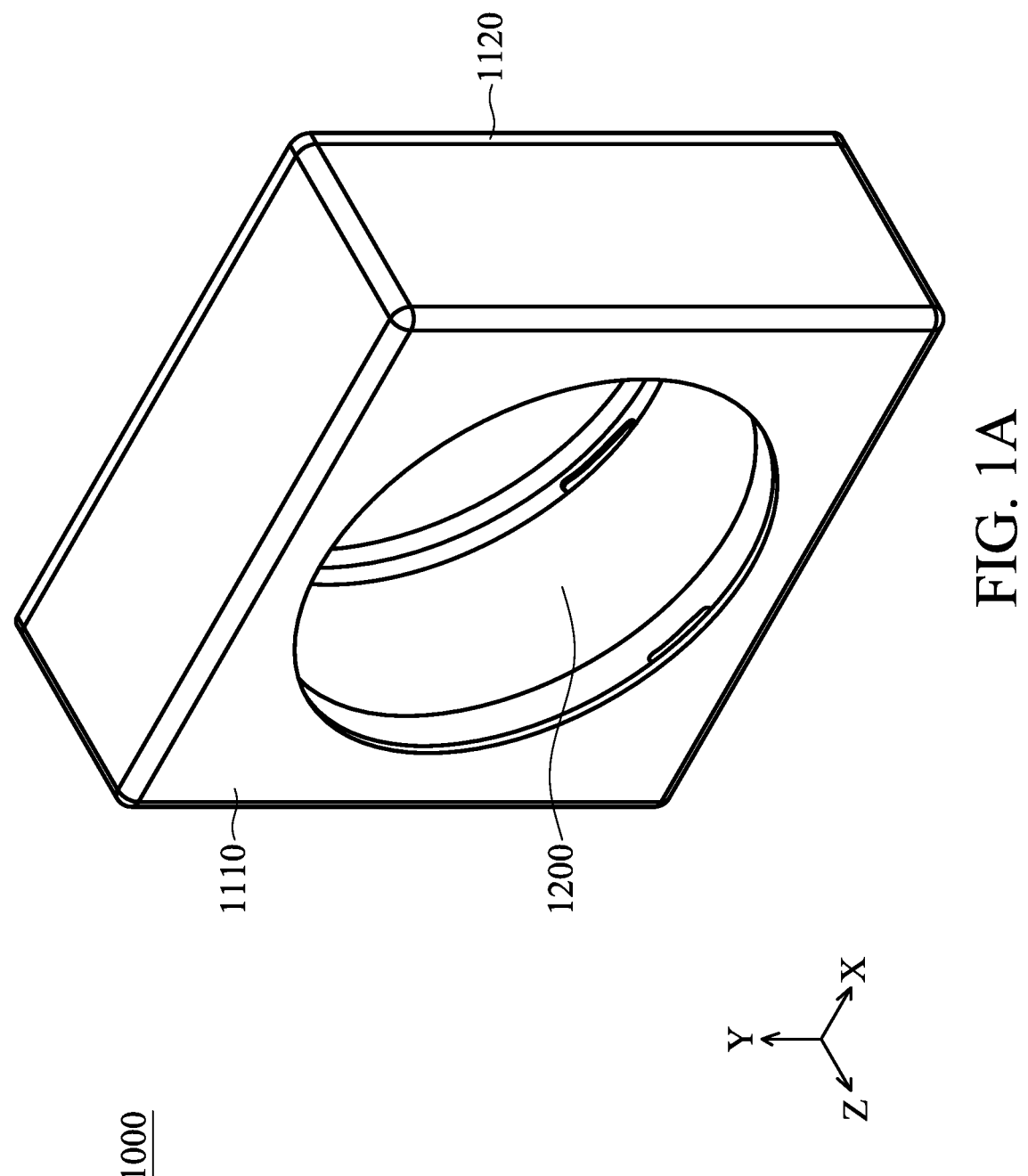
FIG. 1A is a schematic view of an optical element driving mechanism.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
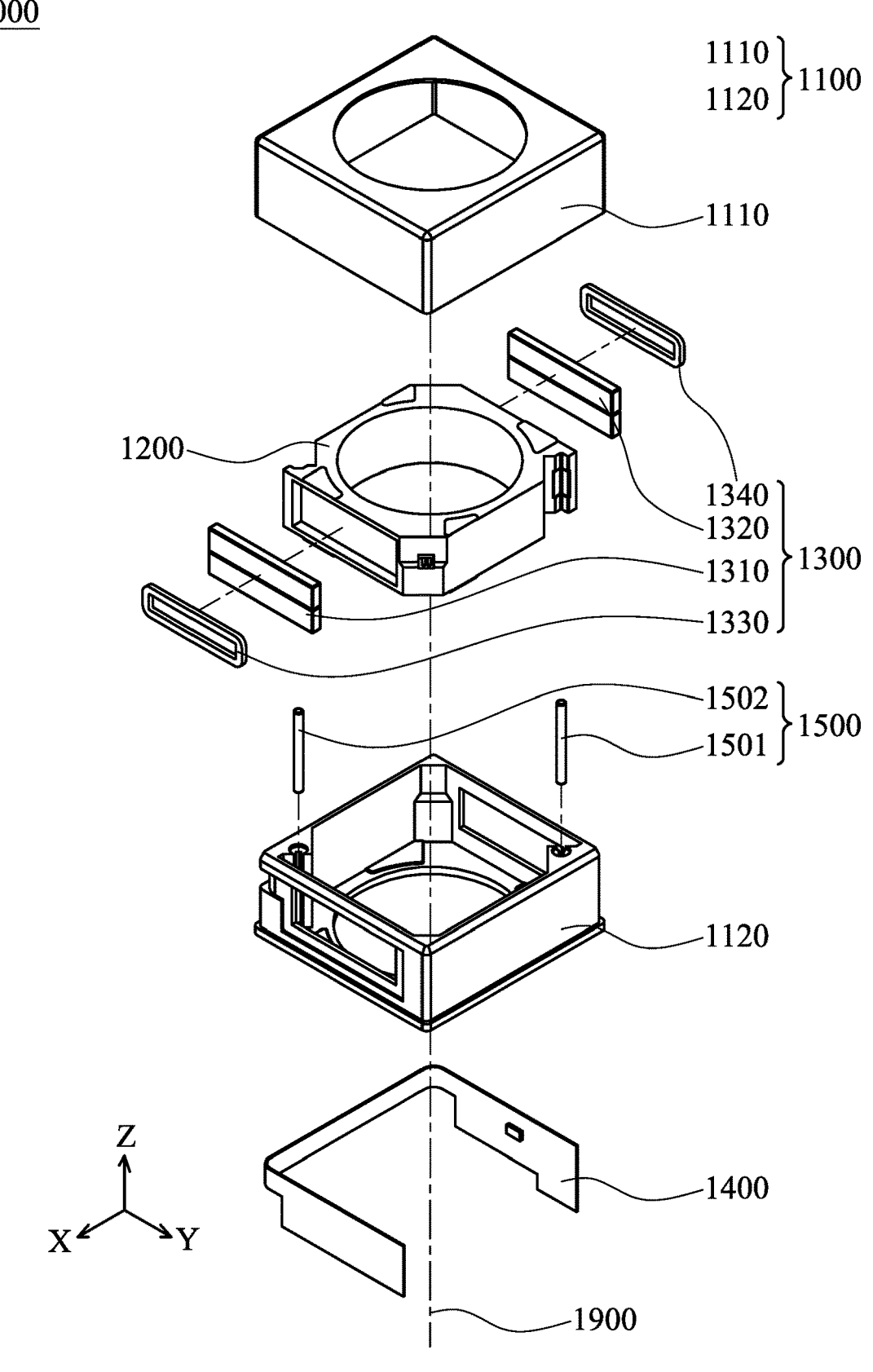
FIG. 1B is an exploded view of the optical element driving mechanism.
Figure 1C:
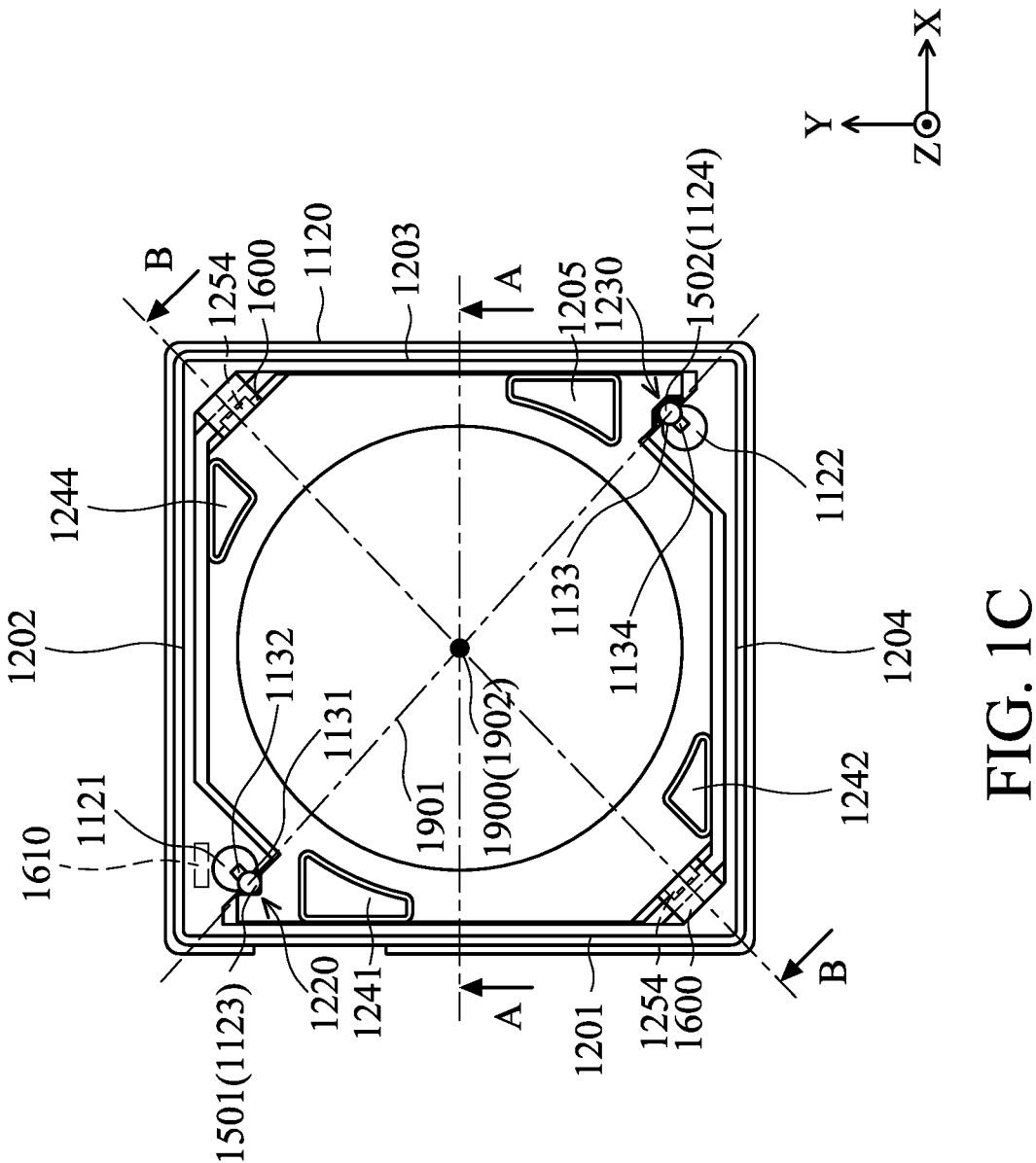
FIG. 1C and FIG. 1D are top views of some elements of the optical element driving mechanism.
Figure 1D:
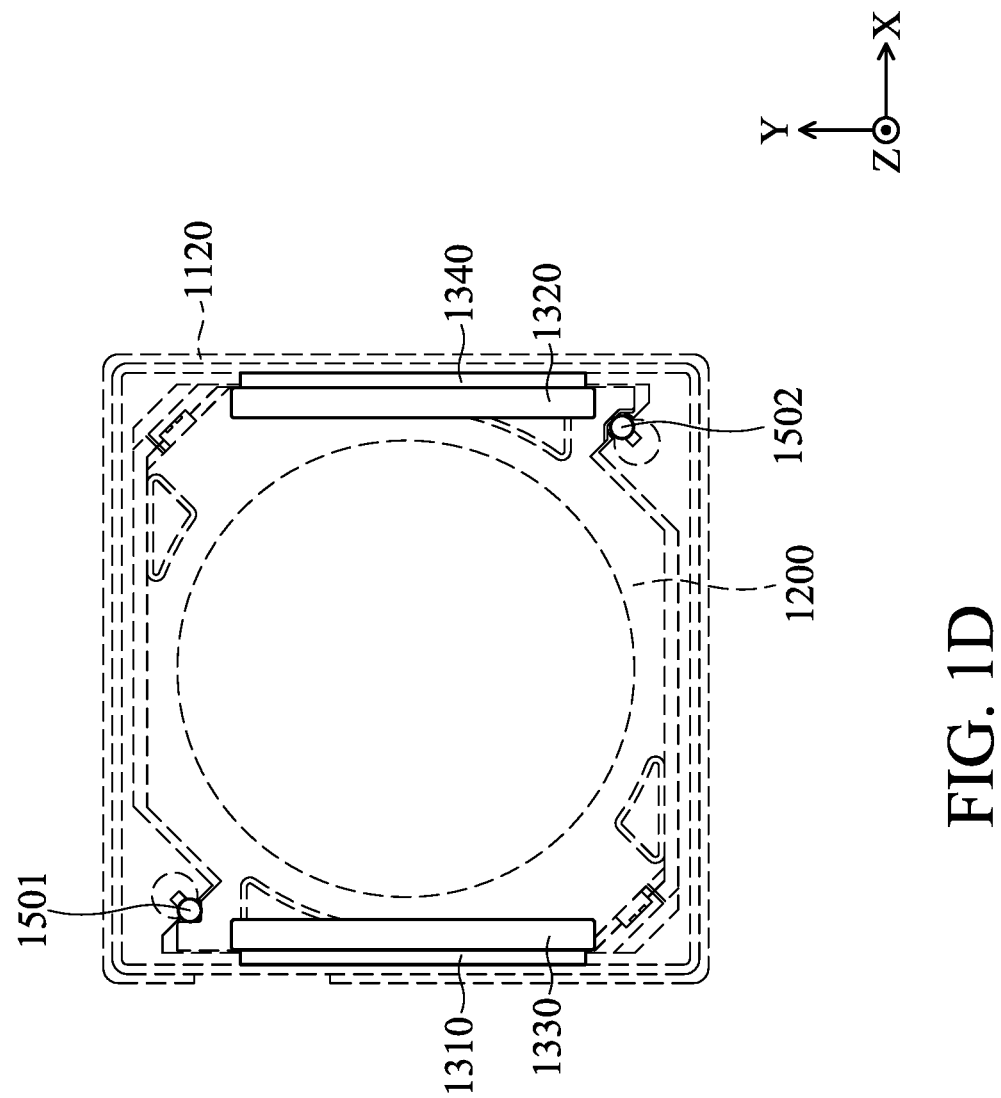
Figure 1E:
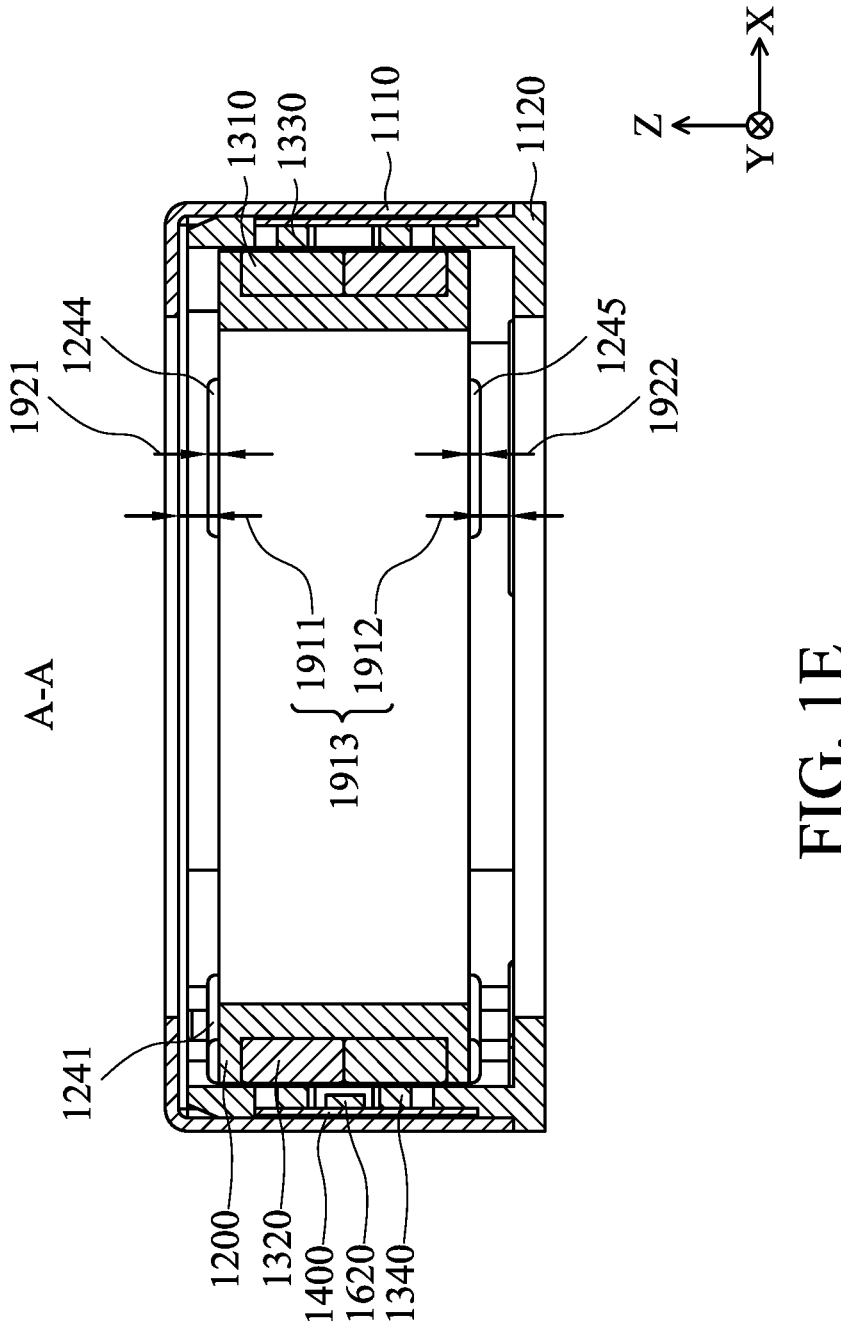
FIG. 1E is a cross-sectional view illustrated along the line A-A in FIG. 1C.
Figure 1F:
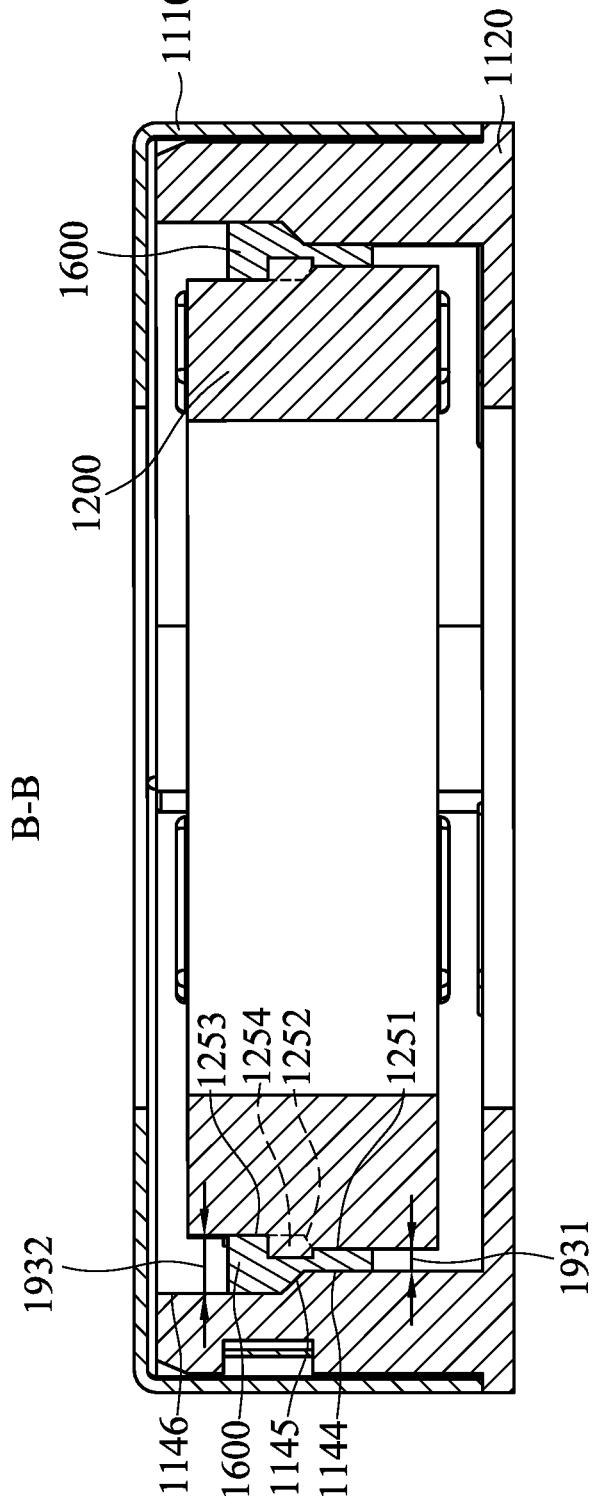
FIG. 1F is a cross-sectional view illustrated along the line B-B in FIG. 1C.
Figure 1G:
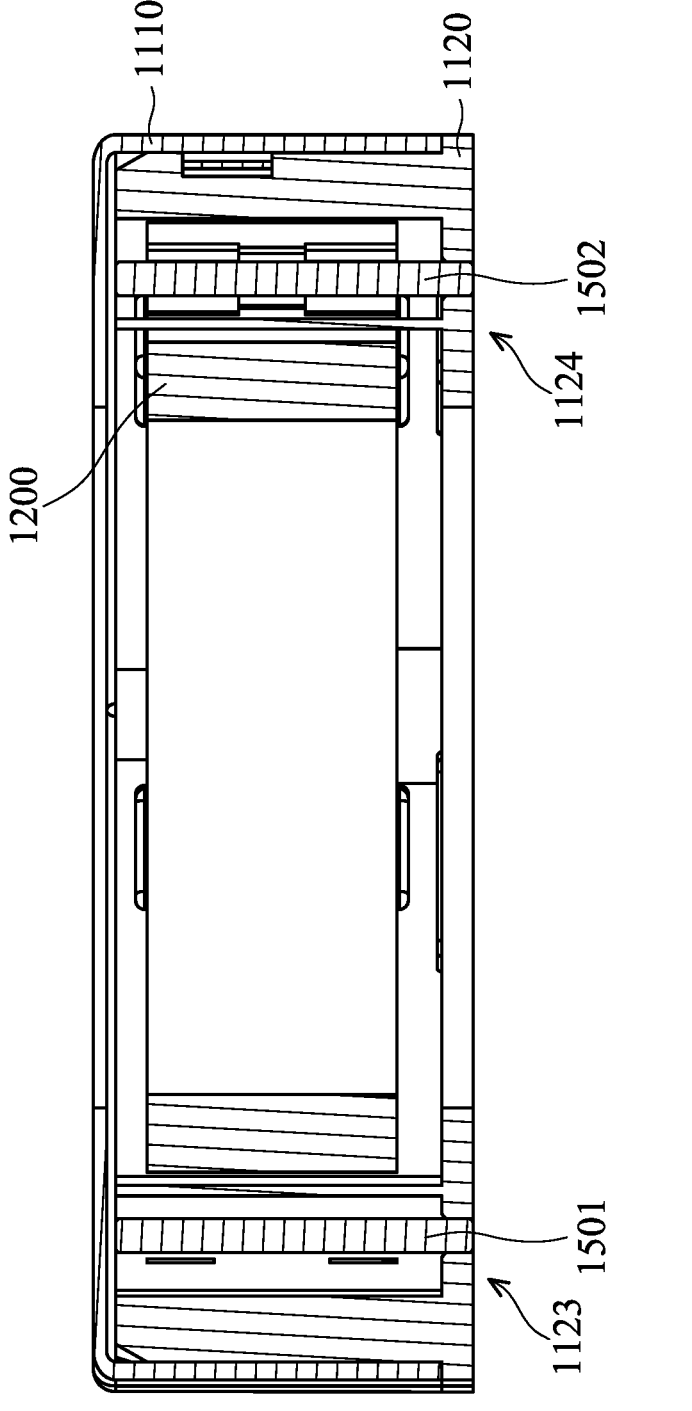
FIG. 1G is a cross-sectional view illustrated along a virtual plane.
Figure 1H:
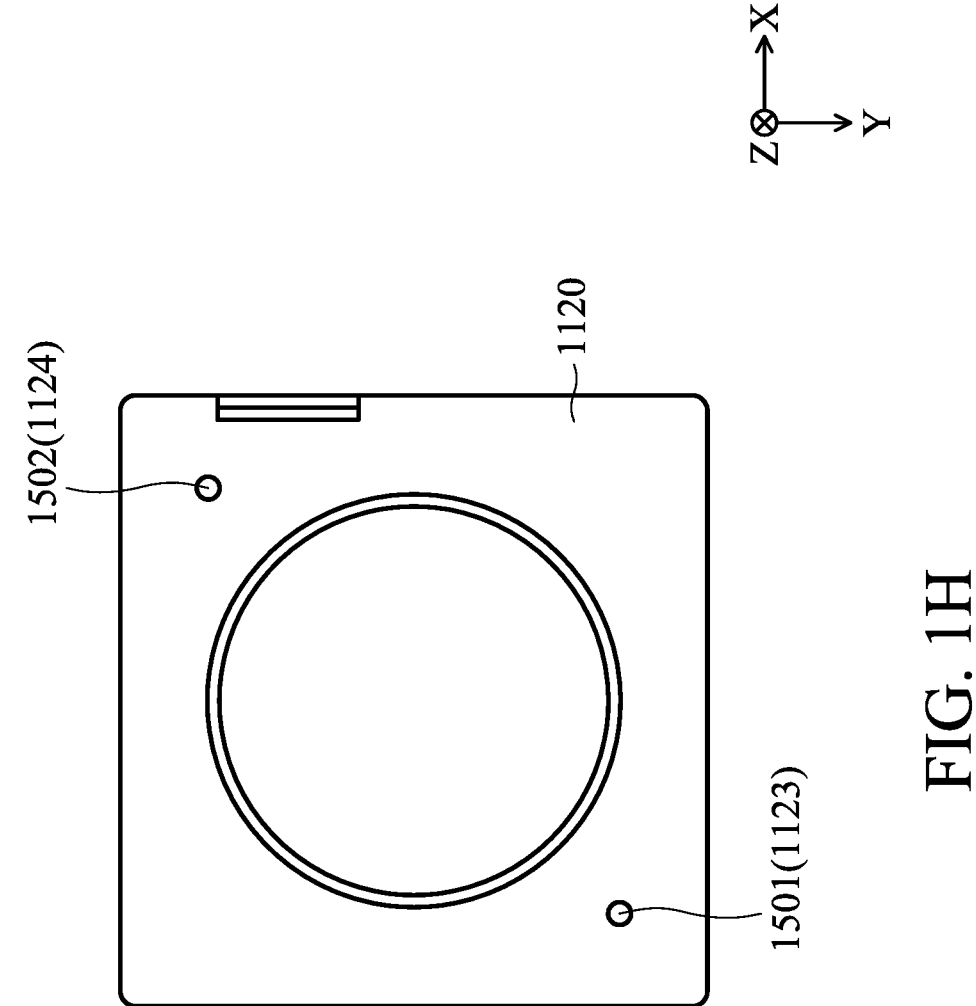
FIG. 1H is a bottom view of the optical element driving mechanism.

Embodiments of the present disclosure provide an optical element driving mechanism for driving a movable portion moving relative to the fixed portion. For example, FIG. 1A is a schematic view of an optical element driving mechanism 1000. FIG. 1B is an exploded view of the optical element driving mechanism 1000. FIG. 1C and FIG. 1D are top views of some elements of the optical element driving mechanism 1000. FIG. 1E is a cross-sectional view illustrated along the line A-A in FIG. 1C. FIG. 1F is a cross-sectional view illustrated along the line B-B in FIG. 1C. FIG. 1G is a cross-sectional view illustrated along a virtual plane 1901. FIG. 1H is a bottom view of the optical element driving mechanism 1000. As shown in FIG. 1A to FIG. 1H, in some embodiments, the optical element driving mechanism 1000 may mainly include a fixed portion 1100, a movable portion 1200, a driving assembly 1300, a circuit assembly 1400, and a guiding assembly 1500 arranged along a main axis 1900. The main axis 1900 may extend in a first direction (e.g. —Z direction).

In some embodiments, the fixed portion 1100 may include a case 1110 and a bottom 1120. The case 1110 and the bottom 1120 may arrange along the main axis 1900 and combine with each other to form a shell to accommodate other elements. For example, the bottom 1120 may be affixed on the case 1110. It should be noted that the case 1110 and the bottom 1120 may have openings with centers corresponding to the main axis 1900 and an image sensor (not shown) disposed outside the optical element driving mechanism 1000. Therefore, the optical element disposed in the optical element driving mechanism 1000 may focus on the image sensor in the direction that the main axis 1900 extends.

In some embodiments, the movable portion 1200 may be disposed in the fixed portion 1100, may have a polygonal shape, and may be used for disposing an optical element (not shown). The movable portion 1200 may have a through hole, and the optical element may be disposed in the through hole. The optical element may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the driving assembly 1300 may include a first magnetic element 1310, a second magnetic element 1320, a first driving coil 1330, and a second driving coil 1340 used for driving the movable portion 1200 moving relative to the fixed portion 1100. In some embodiments, the first magnetic element 1310 and the second magnetic element 1320 may include magnet, may disposed on the movable portion 1200, and may respectively correspond to the first driving coil 1330 and the second driving coil 1340. The first magnetic element 1310 and the second magnetic element 1320 may respectively generate electromagnetic forces with the first driving coil 1330 and the second driving coil 1340 to move the movable portion 1200 relative to the fixed portion 1100 for performing functions like auto focus (AF). In some embodiments, the first magnetic element 1310 and the second magnetic element 1320 may be disposed on the fixed portion 1100, and the first driving coil 1330 and the second driving coil 1340 may be disposed on the movable portion 1200, depending on design requirement.

In some embodiments, the circuit assembly 1400 may be a printed circuit board (PCB) and may be disposed on the fixed portion 1100 (e.g. the bottom 1120) to electrically connect to elements in the optical element driving mechanism 1000 and other external devices. For example, the circuit assembly 1400 may be disposed on three sides of the bottom 1120, such as by adhesive, but the present disclosure is not limited thereto. In some embodiments, the first driving coil 1330 and the second driving coil 1340 may be disposed on the circuit assembly 1400 to allow external signal being transmitted to the first driving coil 1330 and the second driving coil 1340 for controlling the first driving coil 1330 and the second driving coil 1340.

In some embodiments, the guiding assembly 1500 may include a first guiding element 1501 and a second guiding element 1502 and may be disposed on the fixed portion 1100, such as may be disposed on the bottom 1120 to guide the movement of the movable portion 1200 relative to the fixed portion 1100. For example, the first guiding element 1501 and the second guiding element 1502 may be columnar and may extend in an axis parallel to the main axis 1900 (e.g. the Z axis). Therefore, when the movable portion 1200 being driven by the driving assembly 1300 to move relative to the fixed portion 1100, the guiding assembly 1500 may be used for defining the moving direction of the movable portion 1200, such as moving along the Z axis. In some embodiments, the virtual plane 1901 may be defined as a plane pass through the first guiding element 1501 and the second guiding element 1502 and parallel to the main axis 1900. In some embodiments, the main axis 1900 may pass through the virtual plane 1901.

In some embodiments, the optical element driving mechanism 1000 may further include a temperature sensor 1610 disposed on the fixed portion 1100, such as disposed on the bottom 1120. Furthermore, the temperature sensor 1610 may be adjacent to the first guiding element 1501 or the second guiding element 1502, such as may be disposed on an identical corner for sensing the temperature of the optical element to correct the focus change caused by thermal expansion.

In some embodiments, the optical element driving mechanism 1000 may further include a position sensor 1620 disposed in the second driving coil 1340 may be disposed on the circuit assembly 1400 to detect the magnetic field of the second magnetic element 1320, so the position of the movable portion 1200 relative to the fixed portion 1100 may be detected. In some embodiments, the position sensor 1620 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

As shown in FIG. 1C and FIG. 1G, the bottom 1120 may include a first recess 1121, a second recess 1122, a first opening 1123, and a second opening 1124, the first guiding element 1501 is at least partially disposed in the first recess 1121, and the second guiding element 1502 is at least partially disposed in the second recess 1122. Furthermore, the first guiding element 1501 may penetrate the first opening 1123, and the second guiding element 1502 may penetrate the second opening 1124. In other words, when viewed from the first direction (e.g. —Z direction), the first guiding element 1501 and the second guiding element 1502 may be exposed from the bottom 1120 and not exposed from the case 1110. In some embodiments, as shown in FIG. 1H, when viewed from a second direction opposite from the first direction, such as the Z direction, the first guiding element 1501 and the second guiding element 1502 may expose from the bottom 1120 through the first opening 1123 and the second opening 1124. Therefore, the first guiding element 1501 and the second guiding element 1502 may be affixed on the bottom 1120 through the first opening 1123 and the second opening 1124, such as affixed by glue or laser melting.

However, the present disclosure is not limited thereto. For example, in some embodiments, the first guiding element 1501 and the second guiding element 1502 may be affixed on the movable portion 1200 (not shown) and may be movably connect to the fixed portion 1100 by frictional contact, depending on design requirement.

In some embodiments, the first recess 1121 may include a first recess disposing portion 1131 and a first recess gap 1132 disposed in the first recess disposing portion 1131. It should be noted that the first guiding element 1501 is at least partially disposed in the first recess disposing portion 1131 and not disposed in the first recess gap 1132. In some embodiments, the second recess 1122 may include a second recess disposing portion 1133 and a second recess gap 1134 disposed in the second recess disposing portion 1133.

It should be noted that the second guiding element 1502 is at least partially disposed in the second recess disposing portion 1133 and not disposed in the second recess gap 1134. Therefore, additional adhesive may be disposed in the first recess gap 1132 and the second recess gap 1134 to affix the first guiding element 1501 and the second guiding element 1502 on the bottom 1120.

In some embodiments, the first guiding element 1501 and the second guiding element 1502 may include metal and may be magnetic permeable. Therefore, the first guiding element 1501 and the second guiding element 1502 may generate attracting magnetic forces with the first magnetic element 1310 and the second magnetic element 1320 to provide forces from the movable portion 1200 to the first guiding element 1501 and the second guiding element 1502, so the movable portion 1200 may be movably disposed on the first guiding element 1501 and the second guiding element 1502 (or the fixed portion 1100) by frictional contact. In some embodiments, the first recess 1121 and the second recess 1122 may be disposed on opposite sides of the virtual plane 1901.

Figure 2A:
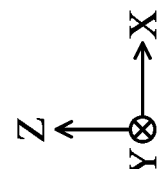
FIG. 2A to FIG. 2E are schematic views of the movable portion viewed in different directions.
Figure 2A:
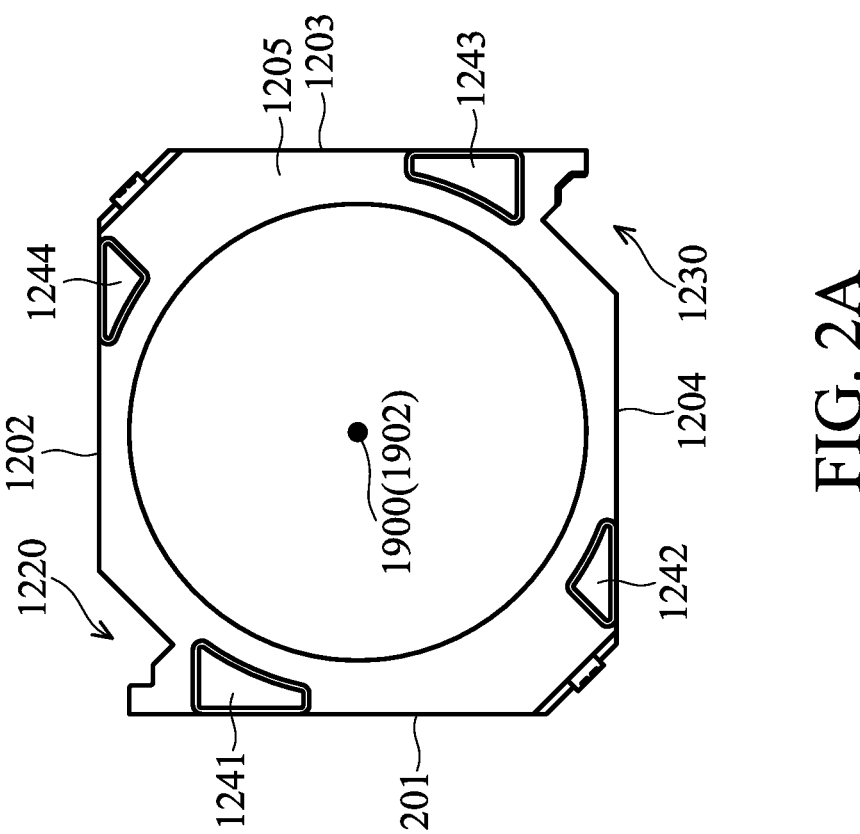
Figure 2B:
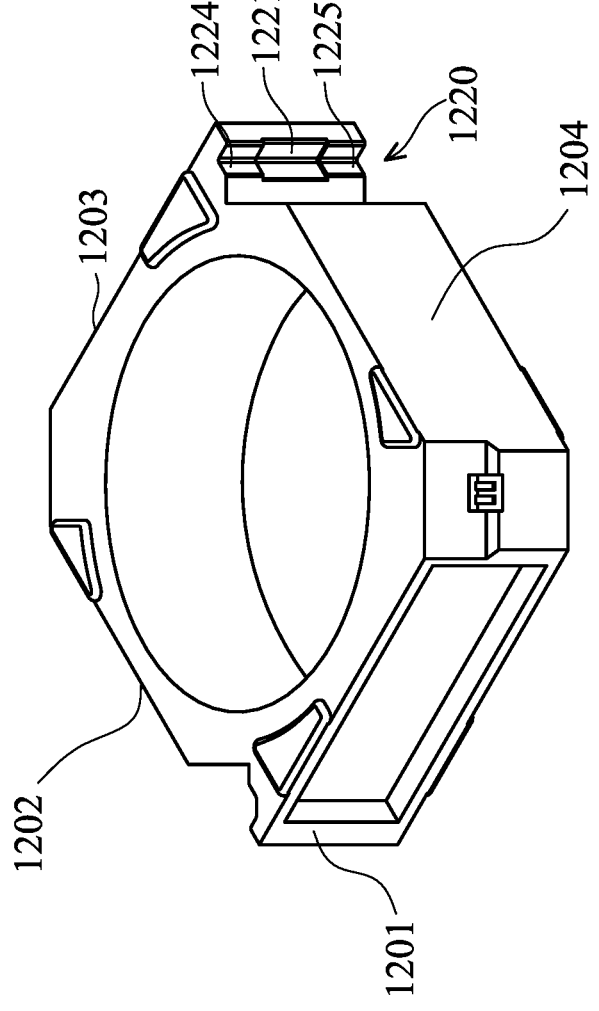
Figure 2C:
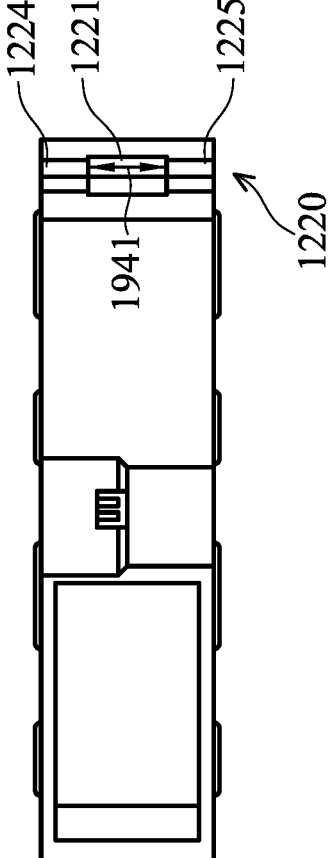
Figure 2D:
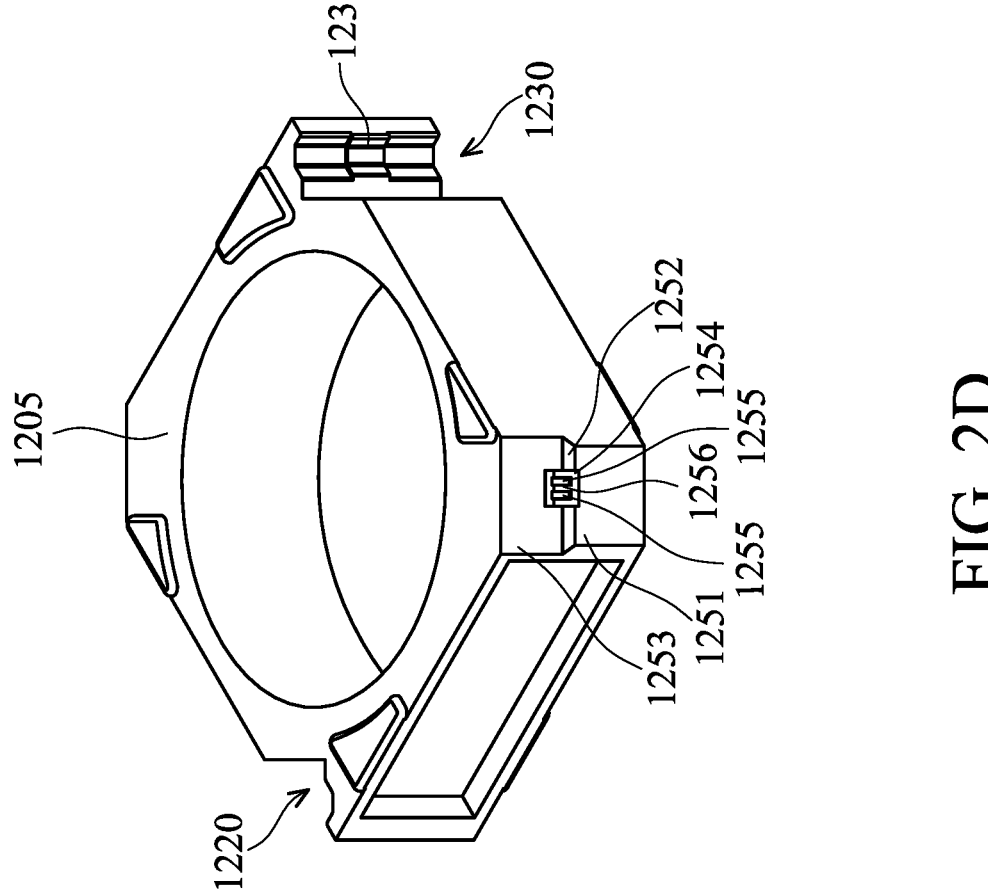
Figure 2E:
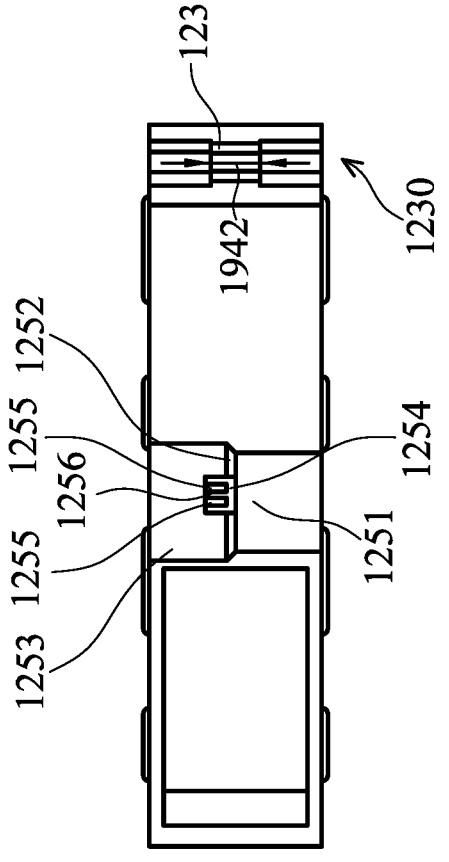
Figure 2F:
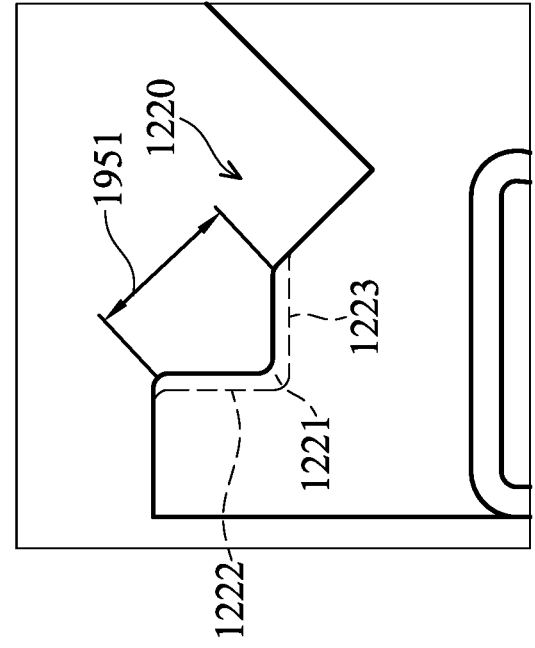
FIG. 2F and FIG. 2G are enlarged views of some portions in FIG. 2A.
Figure 2G:
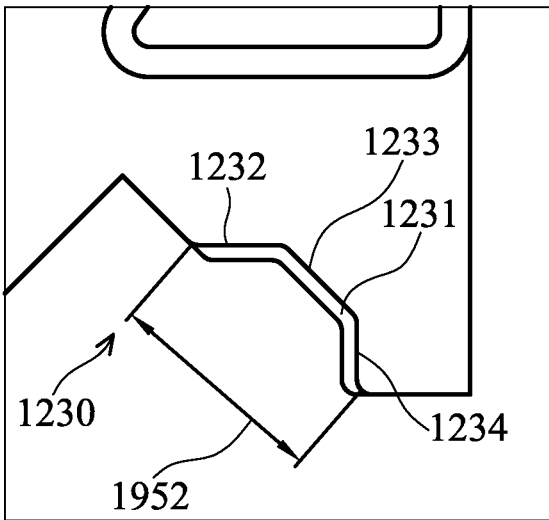

FIG. 2A to FIG. 2E are schematic views of the movable portion 1200 viewed in different directions, and FIG. 2F and FIG. 2G are enlarged views of some portions in FIG. 2A. As shown in FIG. 2A to FIG. 2G, the movable portion 1200 may include a first movable portion side surface 1201, a second movable portion side surface 1202, a third movable portion side surface 1203, a fourth movable portion side surface 1204, and a movable portion main body 1205, and a first guiding recess 1220, a second guiding recess 1230, a first stopping portion 1241, a second stopping portion 1242, a third stopping portion 1243, and a fourth stopping portion 1244 formed on the movable portion main body 1205. Furthermore, the movable portion 1200 may further include a first side surface 1251, a second side surface 1252, a third side surface 1253, and a protrusion 1254 formed on the second side surface 1252 and the third side surface 1253.

In some embodiments, the first guiding element 1501 may be disposed in the first guiding recess 1220, and the second guiding element 1502 may be disposed in the second guiding recess 1230. In some embodiments, the first guiding recess 1220 may have a concave portion 1221, a first leaning surface 1224, and a second leaning surface 1225. The concave portion 1221 may be between the first leaning surface 1224 and the second leaning surface 1225. Furthermore, in some embodiments, a convex portion 1231 may be formed in the second guiding recess 1230.

In some embodiments, the first guiding element 1501 may lean on the first leaning surface 1224 and the second leaning surface 1225, and the second guiding element 1502 may lean on the convex portion 1231 to allow the movable portion 1200 contact the first guiding element 1501 and the second guiding element 1502 by frictional contact. Since the first guiding element 1501 and the second guiding element 1502 are affixed on the fixed portion 1100, the movable portion 1200 may be disposed on the fixed portion 1100 by frictional contact. The movable portion 1200 may perform frictional contact by the first leaning surface 1224, the second leaning surface 1225, and the convex portion 1231 (3 positions), 3 points may define a plane, so such contact method may stabilize the position of the movable portion 1200.

In some embodiments, along the main axis 1900, the concave portion 1221 may have a first length 1941, and the convex portion 1231 may have a second length 1942. In some embodiments, the first length 1941 and the second length 1942 may be different, such as the first length 1941 may be greater than the second length 1942.

The first stopping portion 1241, the second stopping portion 1242, the third stopping portion 1243, and the fourth stopping portion 1244 may extend from the movable portion main body 1205 to the case 1110, such as extend in a second direction (Z direction). The 1245 may extend from the movable portion main body 1205 to the bottom 1120, such extend in the first direction (−Z direction) to be a stopper when the fixed portion 1100 collides with the movable portion 1200, so other elements may be prevented from damaged. As shown in FIG. 1E, the first stopping portion 1241, the second stopping portion 1242, the third stopping portion 1243 or the fourth stopping portion 1244 and the case 1110 may have a first minimum distance 1911 along the main axis 1900, and the 1245 and the bottom 1120 may have a second minimum distance 1912 along the main axis 1900. The sum of the first minimum distance 1911 and the second minimum distance 1912 may be a movable range 1913, which means a maximum movable range of the movable portion 1200 in the Z axis.

In some embodiments, the movable range 1913 may be greater than the second length 1942 and may be less than about 2 times of the second length 1942. For example, if the movable range 1913 is 1.2 mm, the second length 1942 may be less than 1.2 mm and greater than 0.6 mm, such as may be 0.8 mm, but the present disclosure is not limited thereto.

In some embodiments, the first stopping portion 1241, the second stopping portion 1242, the third stopping portion 1243 and the fourth stopping portion 1244 may have a first thickness 1921 along the main axis 1900, the 1245 may have a second thickness 1922 along the main axis 1900, and the first thickness 1921 and the second thickness 1922 may be greater than 0.5 mm and less than the movable range 1913. For example, the first thickness 1921 and the second thickness 1922 may be 0.8 mm to prevent the movable portion 1200 from colliding with positions other than the first stopping portion 1241, the second stopping portion 1242, the third stopping portion 1243, the fourth stopping portion 1244, and the 1245 to protect other elements.

Furthermore, when viewed along the main axis 1900, as shown in FIG. 1C and FIG. 2A, the first stopping portion 1241, the second stopping portion 1242, the third stopping portion 1243, and the fourth stopping portion 1244 may have a center 1902, and the center 1902 may be a point penetrated by the main axis 1900. The first stopping portion 1241, the second stopping portion 1242, the third stopping portion 1243 and the fourth stopping portion 1244 may arrange in a counterclockwise manner relative to the center 1902. It should be noted that when viewed along the main axis 1900, shapes of the first stopping portion 1241 and the third stopping portion 1243 may be identical, and shapes of the second stopping portion 1242 and the fourth stopping portion 1244 may be identical, and the shapes of the first stopping portion 1241 and the third stopping portion 1243 are different to the shapes of the second stopping portion 1242 and the fourth stopping portion 1244. In some embodiments, the first stopping portion 1241 and the third stopping portion 1243 may be rotational symmetrical relative to the center 1902, and the second stopping portion 1242 and the fourth stopping portion 1244 also may be rotational symmetrical relative to the center 1902.

In some embodiments, when viewed along the main axis 1900, the first stopping portion 1241 and the third stopping portion 1243 are closer to the guiding elements, and the second stopping portion 1242 and the fourth stopping portion 1244 are farther away from the guiding elements. For example, the distance between the first stopping portion 1241 and the first guiding element 1501 may be less than the distance between the second stopping portion 1242 or the fourth stopping portion 1244 and the first guiding element 1501, and the distance between the third stopping portion 1243 and the second guiding element 1502 may be less than the distance between the second stopping portion 1242 or the fourth stopping portion 1244 and the second guiding element 1502.

As shown in FIG. 1C, the first guiding recess 1220 and the second guiding recess 1230 may be positioned at opposite sides of the virtual plane 1901. Furthermore, as shown in FIG. 2F and FIG. 2G, when viewed along the main axis 1900, the concave portion 1221 is not exposed from the first guiding recess 1220, and the concave portion 1221 is exposed from the second guiding recess 1230. The first guiding recess 1220 may have a first segment 1222 and a second segment 1223 extend in different directions, and the second guiding recess 1230 may have a third segment 1232, a fourth segment 1233, and a fifth segment 1234 extend in different directions. In other words, the first guiding recess 1220 and the second guiding recess 1230 may have different shapes when viewed along the main axis 1900.

In some embodiments, when viewed along the main axis 1900, in the direction that the fourth segment 1233 extends, the first guiding recess 1220 has a first width 1951, the second guiding recess 1230 has a second width 1952, and the first width 1951 and the second width 1952 may be different, such as the second width 1952 may be greater than the first width 1951. Through this design, it is possible to avoid the movable portion 1200 being unable to assemble with the first guiding element 1501 and the second guiding element 1502 due to assembly tolerances.

Figure 3A:
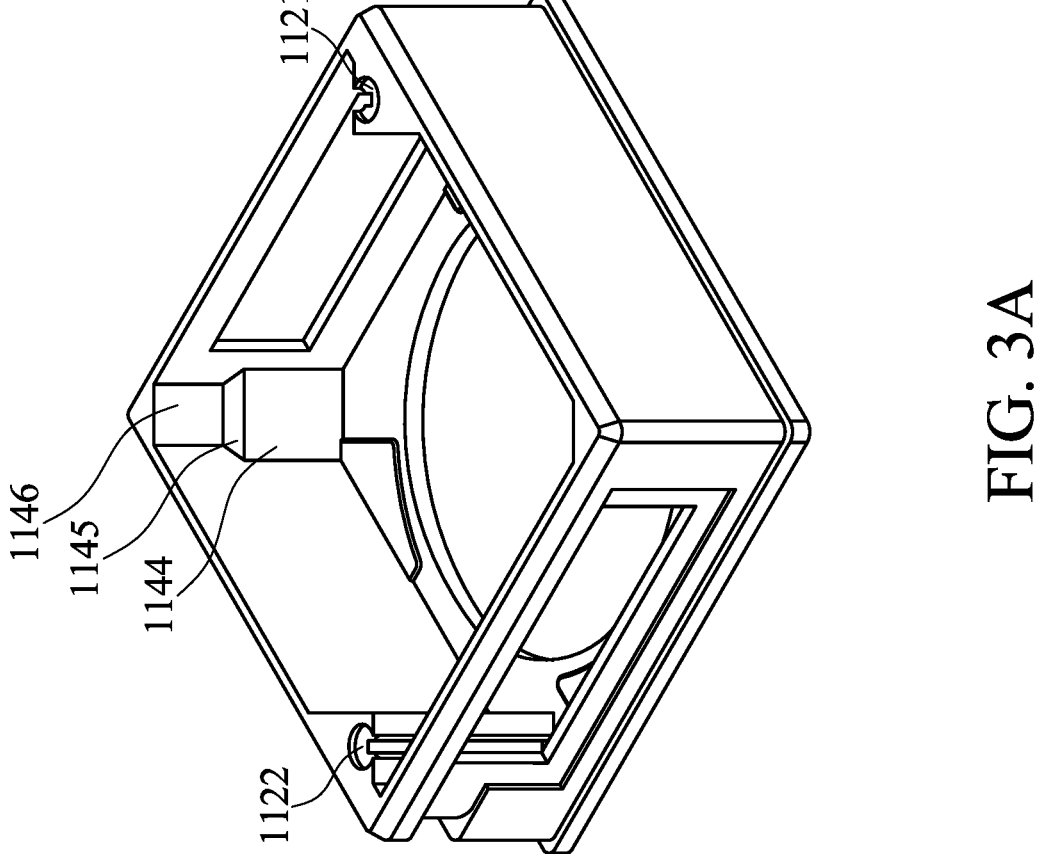
FIG. 3A and FIG. 3B are schematic views of the bottom viewed in different directions.
Figure 3B:
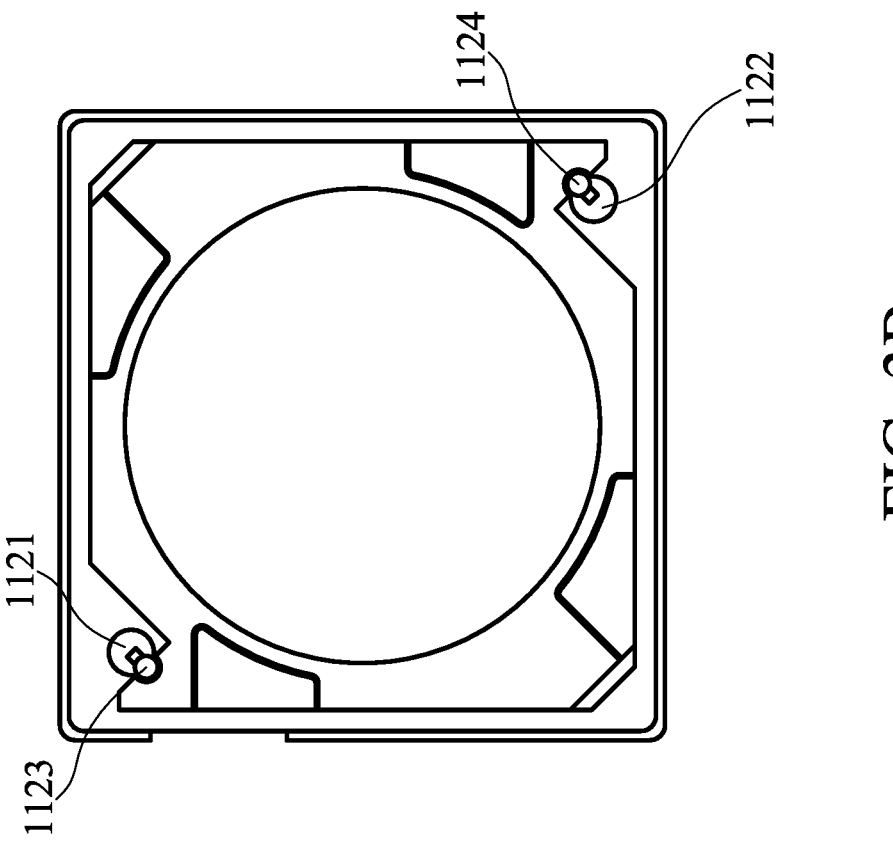

FIG. 3A and FIG. 3B are schematic views of the bottom 1120 viewed in different directions. As shown in FIG. 1F, FIG. 3A, and FIG. 3B, the bottom 1120 may further include a fourth side surface 1144, a fifth side surface 1145, and a sixth side surface 1146 facing the first side surface 1251, the second side surface 1252, and the third side surface 1253 of the movable portion 1200. The first side surface 1251, the second side surface 1252, and the third side surface 1253 may face the bottom 1120, and the fourth side surface 1144, the fifth side surface 1145, and the sixth side surface 1146 may face the movable portion 1200. For example, the first side surface 1251 may face the fourth side surface 1144 and parallel to the fourth side surface 1144, and the third side surface 1253 may face the sixth side surface 1146 and parallel to the sixth side surface 1146. In some embodiments, the first side surface 1251 and the third side surface 1253 may face an identical direction, and the second side surface 1252 may face a direction different to the direction that the first side surface 1251 and the third side surface 1253 face. In some embodiment, the fourth side surface 1144 and the sixth side surface 1146 may face an identical direction, and the fifth side surface 1145 may face a direction different to the direction that the fourth side surface 1144 and the sixth side surface 1146 face/For example, the first side surface 1251, the third side surface 1253, the fourth side surface 1144, and the sixth side surface 1146 may be faces with their normal vectors perpendicular to the main axis 1900, and the second side surface 1252 and the fifth side surface 1145 may be faces with their normal vectors not perpendicular or parallel to the main axis 1900. In other words, when viewed along the main axis 1900, the second side surface 1252 may be exposed from the movable portion 1200, and the fifth side surface 1145 may be exposed from the bottom 1120. In some embodiments, a first distance 1931 is between the first side surface 1251 and the fourth side surface 1144, a second distance 1932 is between the third side surface 1253 and the sixth side surface 1146, and the first distance 1931 and the second distance 1932 may be different, such as the first distance 1931 may be less than the second distance 1932.

In some embodiments, a damping element 1600 may be disposed between the bottom 1120 and the movable portion 1200 to absorb the vibration generated by the movement of the movable portion 1200 relative to the fixed portion 1100. The damping element 1600 may include material that can absorb vibration, such as gel. In some embodiments, the damping element 1600 may be in direct contact with the first side surface 1251, the second side surface 1252, the third side surface 1253, the fourth side surface 1144, the fifth side surface 1145, and the sixth side surface 1146 to increase the contact area and bonding strength.

In some embodiments, the protrusion 1254 may be adjacent to the first side surface 1251 and may be disposed on the second side surface 1252 and the third side surface 1253, and a plurality of glue recess 1255 may be formed in the protrusion 1254. A rib 1256 may be between the glue recess 1255 to separate the glue recess 1255. In some embodiments, the damping element 1600 may be disposed on the protrusion 1254 and the glue recess 1255, and may be in contact with the rib 1256. By providing the protrusion 1254 on the movable portion 1200, and allowing the movable portion 1200 have the first side surface 1251, the second side surface 1252, and the third side surface 1253, the contact area between the damping element 1600 and the movable portion 1200 may be increased to increase their bonding strength. Similarly, by designing the fourth side surface 1144, the fifth side surface 1145, and the sixth side surface 1146 on the bottom 1120, the contact area between the damping element 1600 and the bottom 1120 may be also increased to increase their bonding strength.

FIG. 4A to FIG. 4I may be schematic views of some optical element driving mechanisms in some embodiments of the present disclosure, which mainly show the position relationship between the movable portion 1200 and elements adjacent to the movable portion 1200 when viewed along the main axis 1900, and other elements are omitted for simplicity. It should be noted that other elements of the optical element driving mechanism 1000 may be applied in the following embodiments as well.

Figure 4A:
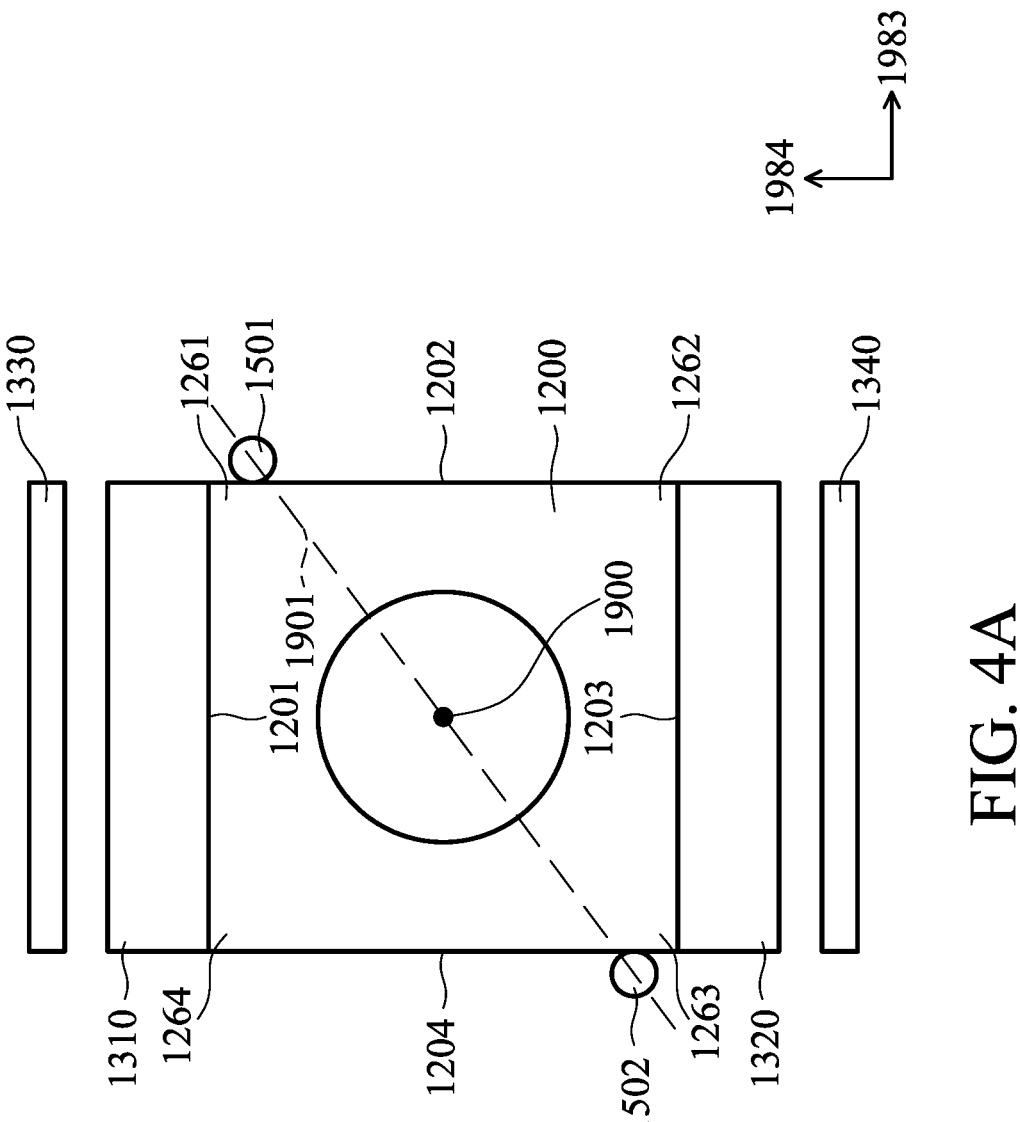
FIG. 4A to FIG. 4I may be schematic views of some optical element driving mechanisms in some embodiments of the present disclosure.

FIG. 4A is a schematic view of a optical element driving mechanism 1001 when viewed along the main axis 1900. As shown in FIG. 4A, the movable portion 1200 may be polygonal (e.g. rectangular, hexagonal, octagonal) and may have a first movable portion corner 1261, a second movable portion corner 1262, a third movable portion corner 1263, and a fourth movable portion corner 1264. In some embodiments, the first movable portion side surface 1201, the second movable portion side surface 1202, the third movable portion side surface 1203, and the fourth movable portion side surface 1204 are adjacent to each other sequentially, the first movable portion corner 1261 may be between the first movable portion side surface 1201 and the second movable portion side surface 1202, the second movable portion corner 1262 may be between the second movable portion side surface 1202 and the third movable portion side surface 1203, the third movable portion corner 1263 may be between the third movable portion side surface 1203 and the fourth movable portion side surface 1204, and the fourth movable portion corner 1264 may be between the fourth movable portion side surface 1204 and the first movable portion side surface 1201.

As shown in FIG. 4A, the first magnetic element 1310 and the second magnetic element 1320 may be disposed on the movable portion 1200, and the first driving coil 1330 and the second driving coil 1340 may be disposed on the fixed portion (not shown for simplicity, such as the aforementioned bottom 1120). In some embodiments, the first magnetic element 1310 may be disposed on the first movable portion side surface 1201, and the second magnetic element 1320 may be disposed on the third movable portion side surface 1203. Furthermore, the first guiding element 1501 may be disposed on the second movable portion side surface 1202, and the second guiding element 1502 may be disposed on the fourth movable portion side surface 1204. In some embodiments, the first guiding element 1501 may be further disposed on the first movable portion corner 1261, and the second guiding element 1502 may be further disposed on the third movable portion corner 1263. As a result, the first guiding element 1501 may be adjacent to the first magnetic element 1310 at the first movable portion corner 1261, and the second guiding element 1502 may be adjacent to the second magnetic element 1320 at the third movable portion corner 1263 to increase their magnetic attractive force. In some embodiments, the virtual plane 1901 may pass through the main axis 1900 or the center of gravity of the movable portion 1200 to increase the stability of the optical element driving mechanism 1001.

Figure 4B:
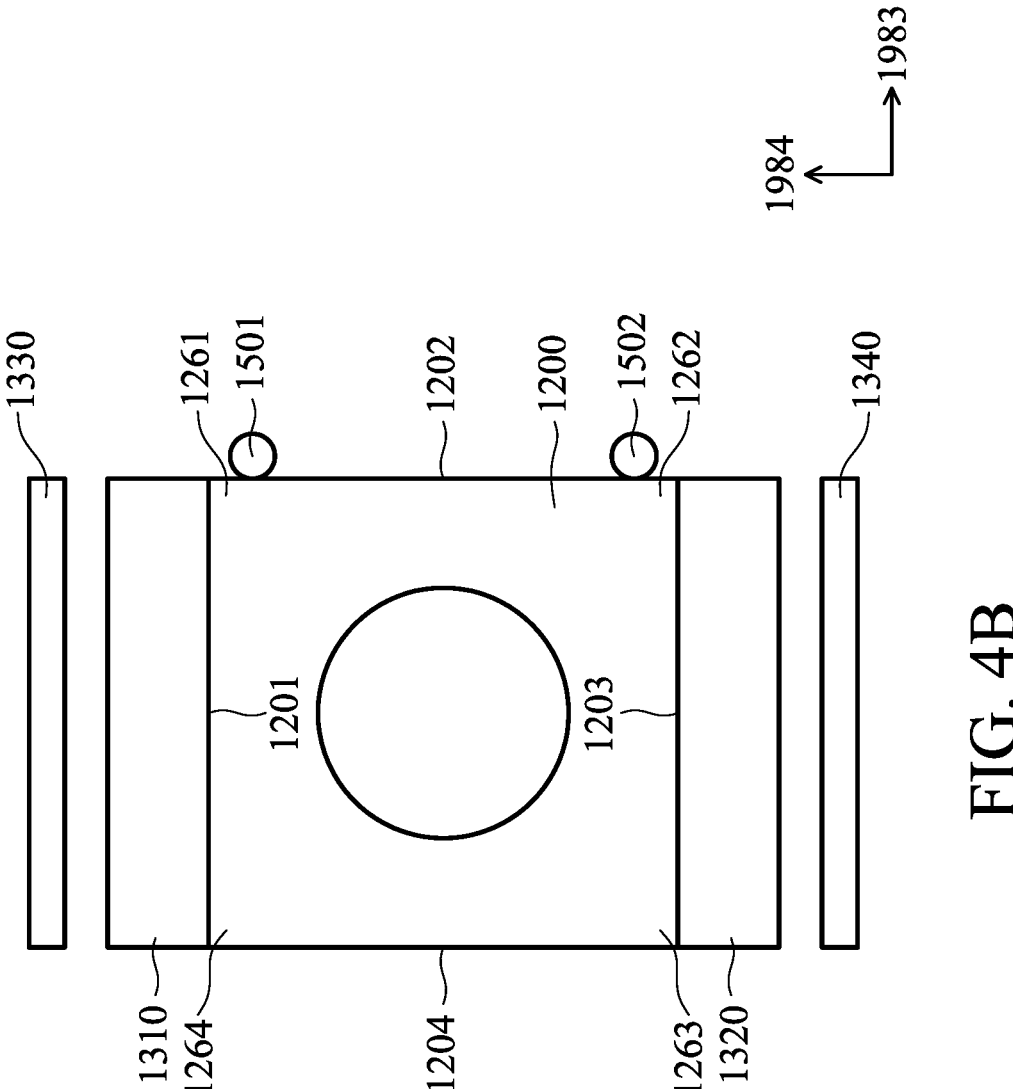

FIG. 4B is a schematic view of a optical element driving mechanism 1002 when viewed along the main axis 1900. As shown in FIG. 4B, the first magnetic element 1310 and the second magnetic element 1320 may be disposed on the movable portion 1200, and the first driving coil 1330 and the second driving coil 1340 may be disposed on the fixed portion (not shown for simplicity, such as the aforementioned bottom 1120). In some embodiments, the first magnetic element 1310 may be disposed on the first movable portion side surface 1201, and the second magnetic element 1320 may be disposed on the third movable portion side surface 1203. Furthermore, the first guiding element 1501 and the second guiding element 1502 may be disposed on the second movable portion side surface 1202. In some embodiments, the first guiding element 1501 may be further disposed on the first movable portion corner 1261, and the second guiding element 1502 may be further disposed on the second movable portion corner 1262. As a result, the first guiding element 1501 may be adjacent to the first magnetic element 1310 at the first movable portion corner 1261, and the second guiding element 1502 may be adjacent to the second magnetic element 1320 at the second movable portion corner 1262 to increase their magnetic attractive force. Furthermore, the first guiding element 1501 and the second guiding element 1502 are disposed on the second movable portion side surface 1202, so the size of the optical element driving mechanism 1002 in the X axis may be increased to achieve miniaturization.

Figure 4C:
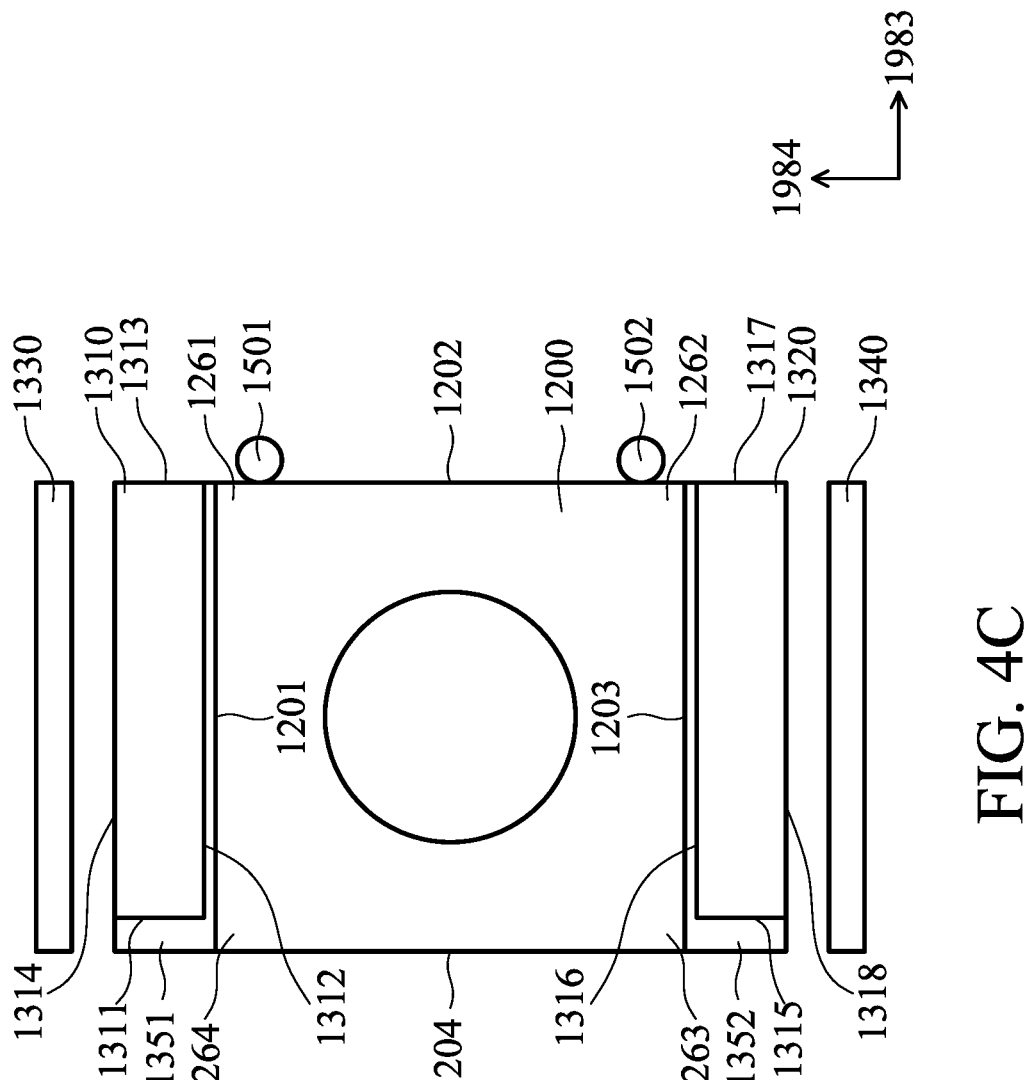

FIG. 4C is a schematic view of a optical element driving mechanism 1003 viewed along the main axis 1900. As shown in FIG. 4C, the first magnetic element 1310 and the second magnetic element 1320 may be disposed on the movable portion 1200, and the first driving coil 1330 and the second driving coil 1340 may be disposed on the fixed portion (not shown for simplicity, such as the aforementioned bottom 1120). In some embodiments, the first magnetic element 1310 may be disposed on the first movable portion side surface 1201, and the second magnetic element 1320 may be disposed on the third movable portion side surface 1203.

In some embodiments, the first guiding element 1501 and the second guiding element 1502 may be disposed on the second movable portion side surface 1202. In some embodiments, the first guiding element 1501 may be further disposed on the first movable portion corner 1261, and the second guiding element 1502 may be further disposed on the second movable portion corner 1262. Therefore, the first guiding element 1501 may be adjacent to the first magnetic element 1310 at the first movable portion corner 1261, and the second guiding element 1502 may be adjacent to the second magnetic element 1320 at the second movable portion corner 1262 to increase their magnetic attractive force. Furthermore, since the first guiding element 1501 and the second guiding element 1502 are disposed on the second movable portion side surface 1202, the size of the optical element driving mechanism 1003 in the X axis may be reduced to achieve miniaturization.

In some embodiments, the optical element driving mechanism 1003 may further include a first magnetic permeable element 1351 and a second magnetic permeable element 1352, such as may include magnetic permeable material. The 1531 may be disposed between the first magnetic element 1310 and the movable portion 1200, and the second magnetic permeable element 1352 may be disposed between the second magnetic element 1320 and the movable portion 1200. In this manner, magnetic interference between the first magnetic element 1310, the second magnetic element 1320, and other elements may be prevented.

In some embodiments, the first magnetic element 1310 may include a first magnetic element side surface 1311, a second magnetic element side surface 1312, a third magnetic element side surface 1313, and a fourth magnetic element side surface 1314 adjacent to each other in sequence. In some embodiments, the second magnetic element side surface 1312 may face the movable portion 1200, and the fourth magnetic element side surface 1314 may face the first driving coil 1330. In some embodiments, the first magnetic permeable element 1351 may be L-shaped. In particular, the first magnetic permeable element 1351 may be disposed on the first magnetic element side surface 1311 and the second magnetic element side surface 1312, and does not disposed on the third magnetic element side surface 1313 and the fourth magnetic element side surface 1314. In other words, the first guiding element 1501 and the first magnetic element 1310 are not fully separated by the first magnetic permeable element 1351, such as a connection between a point of the first guiding element 1501 and a point of the first magnetic permeable element 1351 does not pass through the first magnetic permeable element 1351 to prevent the magnetic force between the first guiding element 1501 and the first magnetic element 1310 from being interfered.

In some embodiments, the second magnetic element 1320 may include a fifth magnetic element side surface 1315, a sixth magnetic element side surface 1316, a seventh magnetic element side surface 1317, and a eighth magnetic element side surface 1318 adjacent to each other in sequence. In some embodiments, the sixth magnetic element side surface 1316 may face the movable portion 1200, and the eighth magnetic element side surface 1318 may face the second driving coil 1340. In some embodiments, the second magnetic permeable element 1352 may be L-shaped. In particular, the second magnetic permeable element 1352 may be disposed on the fifth magnetic element side surface 1315 and the sixth magnetic element side surface 1316, and does not disposed on the seventh magnetic element side surface 1317 and the eighth magnetic element side surface 1318. In other words, the second guiding element 1502 and the second magnetic element 1320 are not fully separated by the second magnetic permeable element 1352, such as a connection between a point of the second guiding element 1502 and a point of the second magnetic permeable element 1352 does not pass through the second magnetic permeable element 1352 to prevent the magnetic force between the second guiding element 1502 and the second magnetic element 1320 from being interfered. In some embodiments, the first magnetic element side surface 1311, the fifth magnetic element side surface 1315, and the fourth movable portion side surface 1204 may face an identical direction, and the third magnetic element side surface 1313, the seventh magnetic element side surface 1317, and the second movable portion side surface 1202 may face an identical direction.

Figure 4D:
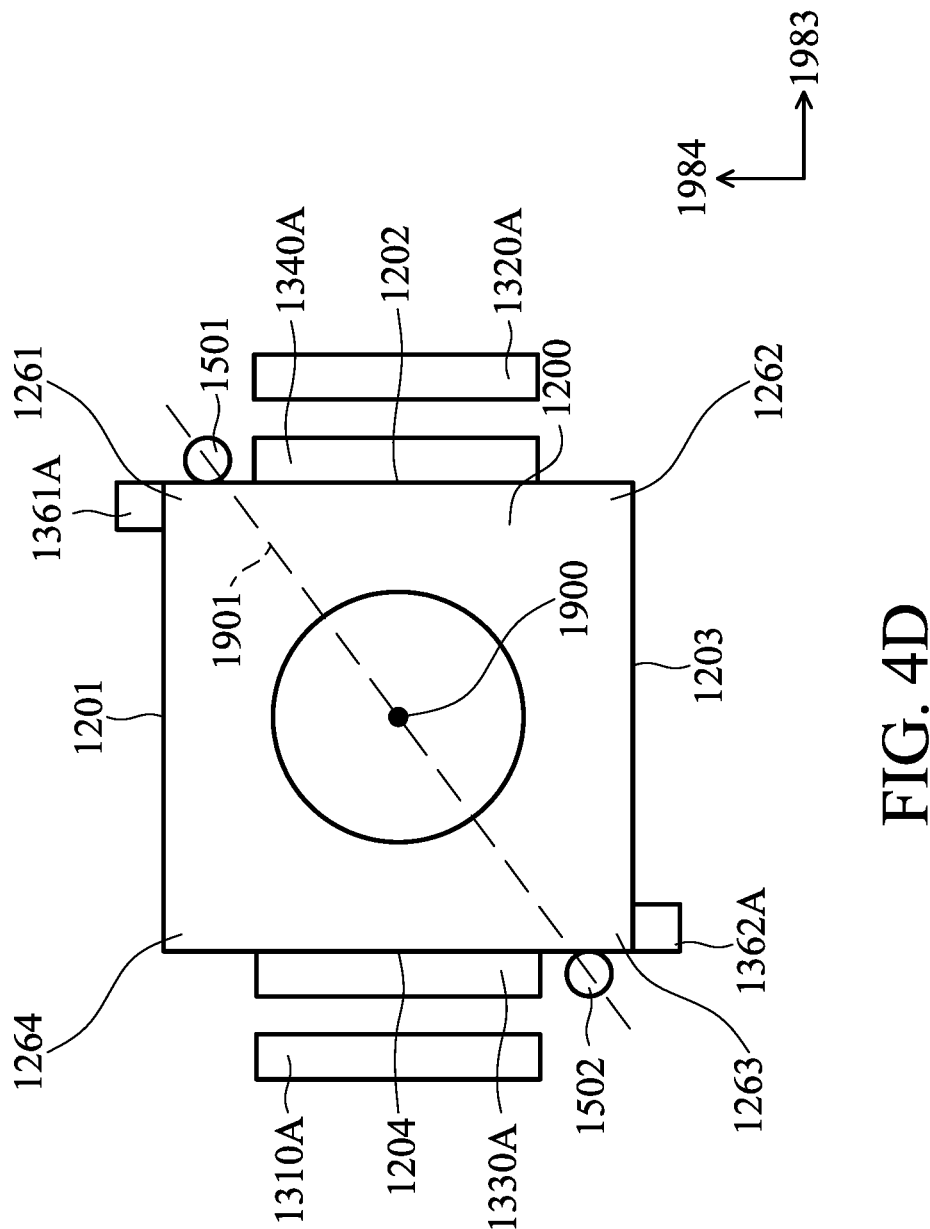

FIG. 4D is a schematic view of a optical element driving mechanism 1004 viewed along the main axis 1900. As shown in FIG. 4D, its driving assembly may include a first magnetic element 1310A, a second magnetic element 1320A, a first driving coil 1330A, and a second driving coil 1340A. In some embodiments, the first driving coil 1330A and the second driving coil 1340A may be disposed on the movable portion 1200, such as the first driving coil 1330A may be disposed on the fourth movable portion side surface 1204, and the second driving coil 1340A may be disposed on the second movable portion side surface 1202. Furthermore, the first magnetic element 1310A and the second magnetic element 1320A may be disposed on the fixed portion (e.g. the bottom 1120).

Moreover, the first guiding element 1501 may be disposed on the second movable portion side surface 1202, and the second guiding element 1502 may be disposed on the fourth movable portion side surface 1204. In some embodiments, the first guiding element 1501 may be further disposed on the first movable portion corner 1261, and the second guiding element 1502 may be further disposed on the third movable portion corner 1263.

In some embodiments, the optical element driving mechanism 1004 may further include a third magnetic element 1361A and a fourth magnetic element 1362A. In some embodiments, the third magnetic element 1361A may be disposed on the first movable portion side surface 1201 and the first movable portion corner 1261. The fourth magnetic element 1362A may be disposed on the third movable portion side surface 1203 and the third movable portion corner 1263. Therefore, the first guiding element 1501 may be adjacent to the third magnetic element 1361A at the first movable portion corner 1261, and the second guiding element 1502 may be adjacent to the fourth magnetic element 1362A at the third movable portion corner 1263 to increase their magnetic attractive force.

In some embodiments, the first magnetic element 1310A and the third magnetic element 1361A are disposed on an identical side of the virtual plane 1901, and the second magnetic element 1320A and the fourth magnetic element 1362A are disposed on another side of the virtual plane 1901. The main axis 1900 may penetrate the virtual plane 1901. In some embodiments, the third magnetic element 1361A and the 1632A may be smaller than the first magnetic element 1310A and the second magnetic element 1320A. For example, when viewed along the main axis 1900, an axis parallel to the extending direction of the first magnetic element 1310 may be defined as a fourth axis 1984, and an axis perpendicular to the fourth axis 1984 may be defined as a third axis 1983. In the fourth axis 1984, the length of the third magnetic element 1361A may be less than the length of the first magnetic element 1310A, and the length of the fourth magnetic element 1362A may be less than the length of the second magnetic element 1320A.

Figure 4E:
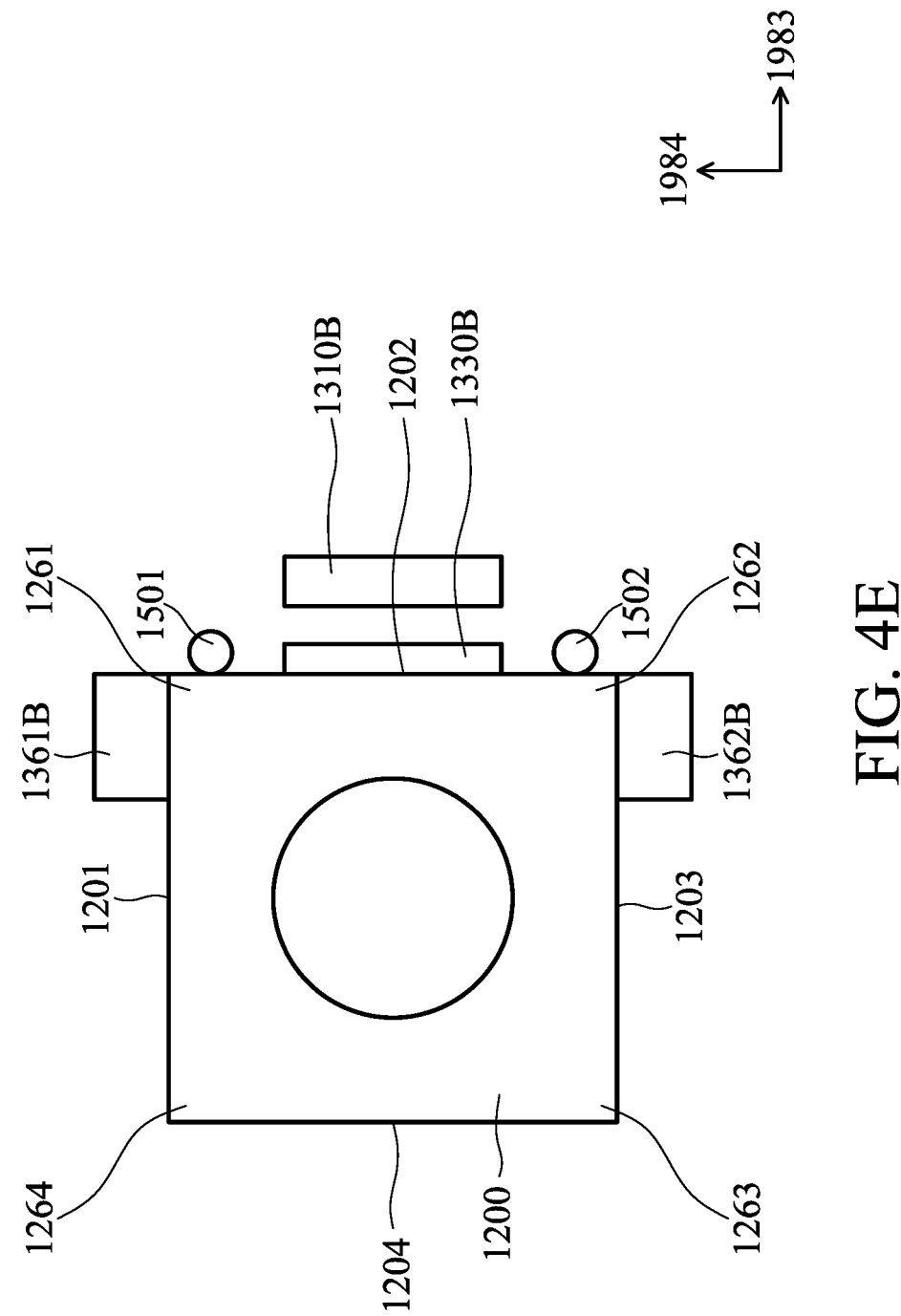

FIG. 4E is a schematic view of a optical element driving mechanism 1005 viewed along the main axis 1900. As shown in FIG. 4E, the driving assembly of the optical element driving mechanism 1005 may include a first magnetic element 1310B and a first driving coil 1330B. In some embodiments, the first magnetic element 1310B may be disposed on the fixed portion, and the first driving coil 1330B may be disposed on the second movable portion side surface 1202. Therefore, the numbers of the elements in the driving assembly may be reduced to achieve miniaturization.

Furthermore, the first guiding element 1501 and the second guiding element 1502 may be disposed on the second movable portion side surface 1202. In some embodiments, the first guiding element 1501 may be further disposed on the first movable portion corner 1261, and the second guiding element 1502 may be further disposed on the second movable portion corner 1262.

In some embodiments, the optical element driving mechanism 1005 further includes a third magnetic element 1361B and a fourth magnetic element 1362B. In some embodiments, the third magnetic element 1361B may be disposed on the first movable portion side surface 1201 and the first movable portion corner 1261. The fourth magnetic element 1362B may be disposed on the third movable portion side surface 1203 and the second movable portion corner 1262. Therefore, the first guiding element 1501 may be adjacent to the 1631B at the first movable portion corner 1261, and the second guiding element 1502 may be adjacent to the fourth magnetic element 1362B at the second movable portion corner 1262 to increase their magnetic attractive forces. Furthermore, since the first guiding element 1501 and the second guiding element 1502 are disposed on the second movable portion side surface 1202, the size of the optical element driving mechanism 1005 in the X axis may be reduced to achieve miniaturization.

Figure 4F:
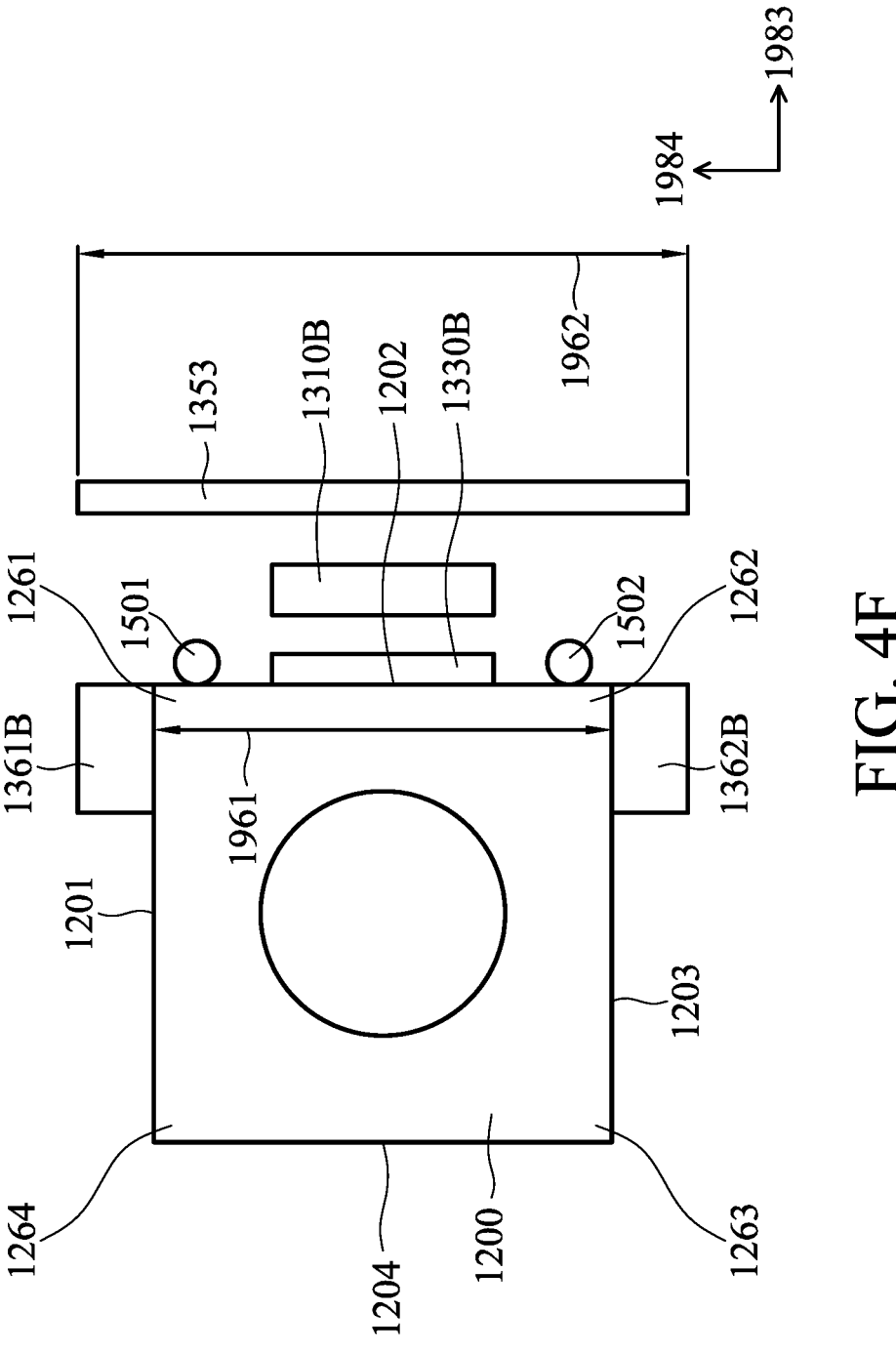

FIG. 4F is a schematic view of a optical element driving mechanism 1006 viewed along the main axis 1900. As shown in FIG. 4F, the driving assembly of the optical element driving mechanism 1006 may include a first magnetic element 1310B and a first driving coil 1330B. In some embodiments, the first magnetic element 1310B may be disposed on the fixed portion, and the first driving coil 1330B may be disposed on the second movable portion side surface 1202. Such configuration may reduce the numbers of elements in the driving assembly to achieve miniaturization.

Furthermore, the first guiding element 1501 and the second guiding element 1502 may be disposed on the second movable portion side surface 1202. In some embodiments, the first guiding element 1501 may be further disposed at the first movable portion corner 1261, and the second guiding element 1502 may be disposed at the second movable portion corner 1262.

In some embodiments, the optical element driving mechanism 1006 may further include a third magnetic element 1361B and a fourth magnetic element 1362B. In some embodiments, the third magnetic element 1361B may be disposed on the first movable portion side surface 1201 and the first movable portion corner 1261. The fourth magnetic element 1362B may be disposed on the third movable portion side surface 1203 and the second movable portion corner 1262. Therefore, the first guiding element 1501 may be adjacent to the third magnetic element 1361B at the first movable portion corner 1261, and the second guiding element 1502 may be adjacent to the fourth magnetic element 1362B at the second movable portion corner 1262 to increase their magnetic attractive force. Furthermore, the first guiding element 1501 and the second guiding element 1502 are disposed on the second guiding element 1502, so the size of the optical element driving mechanism 1006 in the X axis may be reduced to achieve miniaturization.

In some embodiments, the optical element driving mechanism 1006 may further include a first magnetic permeable element 1353 disposed on the fixed portion, wherein the first magnetic permeable element 1353 and the first driving coil 1330B may be disposed on opposite sides of the first magnetic element 1310B, and the movable portion 1200 and the first magnetic element 1310B may also be disposed on opposite sides of the first driving coil 1330B. In some embodiments, in the third axis 1983, at least a portion of the third magnetic element 1361B and the fourth magnetic element 1362B may overlap the first magnetic permeable element 1353. Furthermore, in the fourth axis 1984, the distance 1961 between the third magnetic element 1361B and the fourth magnetic element 1362B may be less than the length 1962 of the first magnetic permeable element 1353. Therefore, the magnetic field of the first magnetic element 1310B, the third magnetic element 1361B, and the fourth magnetic element 1362B may be guided to concentrate the magnetic force and prevent interference with other elements.

Figure 4G:
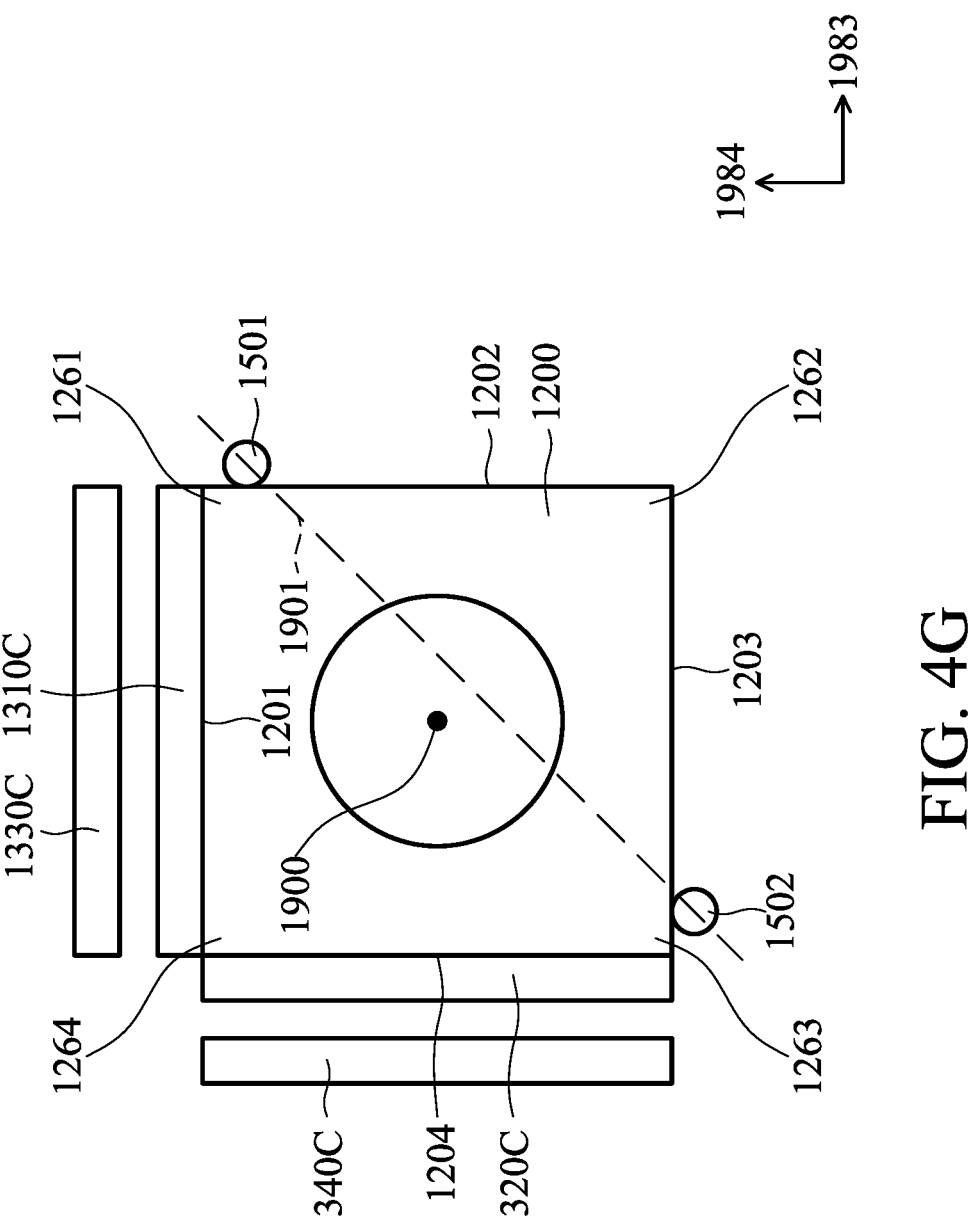

FIG. 4G is a schematic view of a optical element driving mechanism 1007 viewed along the main axis 1900. As shown in FIG. 4G, the driving assembly of the optical element driving mechanism 1007 may include a first magnetic element 1310C, a second magnetic element 1320C, a first driving coil 1330C, and a second driving coil 1340C. The first magnetic element 1310C and the second magnetic element 1320C may be disposed on the movable portion 1200, and the first driving coil 1330C and the second driving coil 1340C may be disposed on the fixed portion (not shown for simplicity, such as the bottom 1120). In some embodiments, the first magnetic element 1310C may be disposed on the first movable portion side surface 1201, and the second magnetic element 1320C may be disposed on the fourth movable portion side surface 1204.

Furthermore, the first guiding element 1501 may be disposed on the second movable portion side surface 1202, and the second guiding element 1502 may be disposed on the 1503. In some embodiments, the first guiding element 1501 may be further disposed at the first movable portion corner 1261, and the second guiding element 1502 may be further disposed at the third movable portion corner 1263. As a result, the first guiding element 1501 may be adjacent to the first magnetic element 1310C at the first movable portion corner 1261, and the second guiding element 1502 may be adjacent to the second magnetic element 1320C at the third movable portion corner 1263 to increase their magnetic attractive force. In some embodiments, the main axis 1900 does not pass through the virtual plane 1901. Therefore, the driving assembly may be disposed on one side of the optical element driving mechanism 1007, and other elements may be disposed on other sides.

Figure 4H:
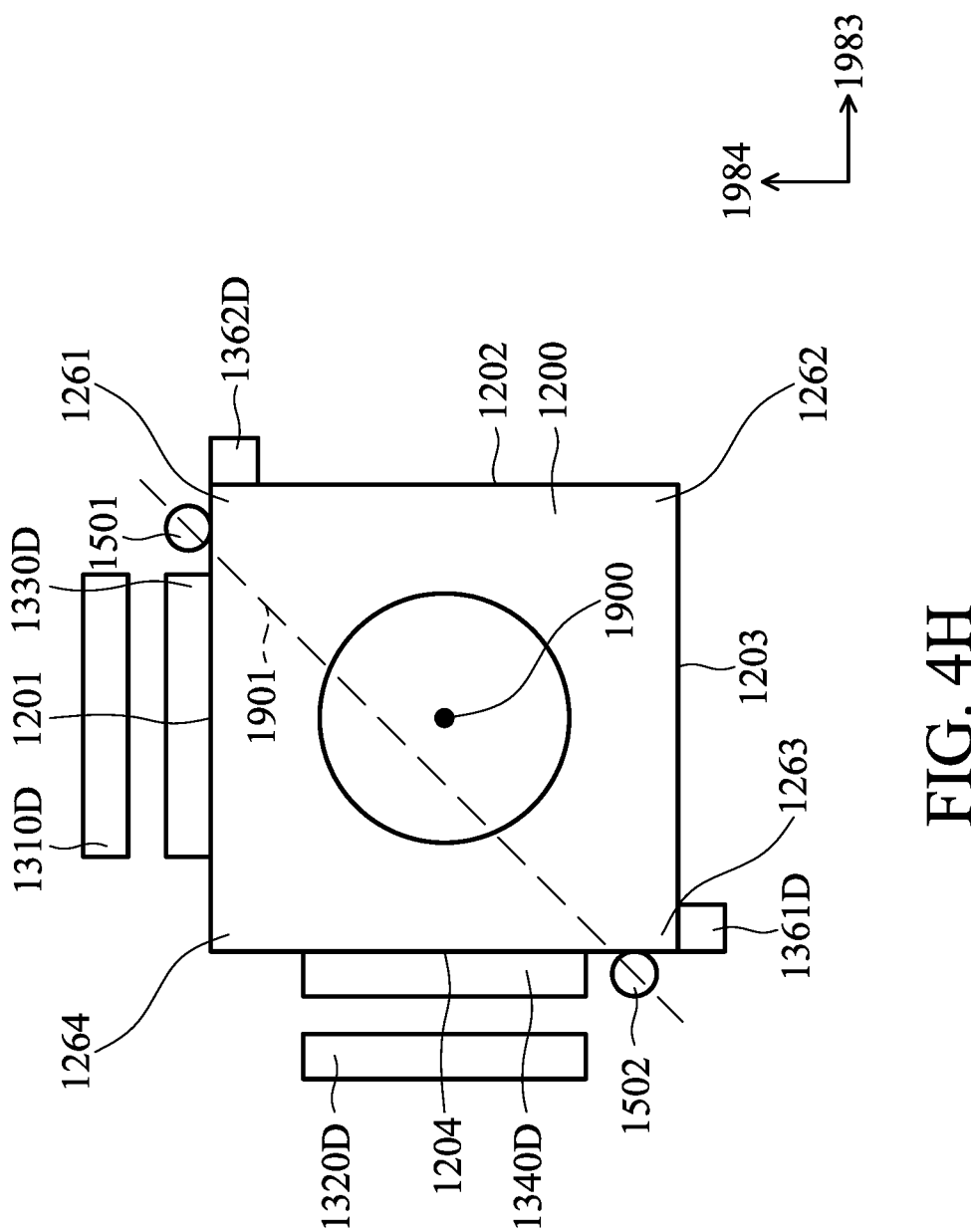

FIG. 4H is a schematic view of a optical element driving mechanism 1008 viewed along the main axis 1900. As shown in FIG. 4H, the driving assembly of the optical element driving mechanism 1008 may include a first magnetic element 1310D, a second magnetic element 1320D, a first driving coil 1330D, and a second driving coil 1340D. The first magnetic element 1310D and the second magnetic element 1320D may be disposed on the fixed portion, and the first driving coil 1330D and the second driving coil 1340D may be disposed on the movable portion 1200. In some embodiments, the first driving coil 1330D may be disposed on the first movable portion side surface 1201, and the second driving coil 1340D may be disposed on the fourth movable portion side surface 1204.

Furthermore, the first guiding element 1501 may be disposed on the first movable portion side surface 1201, and the second guiding element 1502 may be disposed on the fourth movable portion side surface 1204. In some embodiments, the first guiding element 1501 may be further disposed on the first movable portion corner 1261, and the second guiding element 1502 may be further disposed on the third movable portion corner 1263. In some embodiments, the optical element driving mechanism 1008 may further include a third magnetic element 1361D and a fourth magnetic element 1362D. In some embodiments, the third magnetic element 1361D may be disposed on the second movable portion side surface 1202 and the first movable portion corner 1261. The fourth magnetic element 1362D may be disposed on the third movable portion side surface 1203 and the third movable portion corner 1263.

As a result, the first guiding element 1501 may be adjacent to the third magnetic element 1361D at the first movable portion corner 1261, and the second guiding element 1502 may be adjacent to the fourth magnetic element 1362D at the third movable portion corner 1263 to increase their magnetic attractive force. In some embodiments, the main axis 1900 does not pass through the virtual plane 1901. Therefore, the driving assembly may be disposed on one side of the optical element driving mechanism 1008, and other elements may be disposed on other sides.

In some embodiments, the first magnetic element 1310D, the second magnetic element 1320D, the first driving coil 1330D, and the second driving coil 1340D may be disposed on an identical side of the virtual plane 1901, and the third magnetic element 1361D and the fourth magnetic element 1362D may be disposed on another side of the virtual plane 1901. In the third axis 1983, the length of the third magnetic element 1361D is less than the length of the first magnetic element 1310D. In the fourth axis 1984, the length of the fourth magnetic element 1362D is less than the length of the second magnetic element 1320D to achieve miniaturization.

Figure 4I:
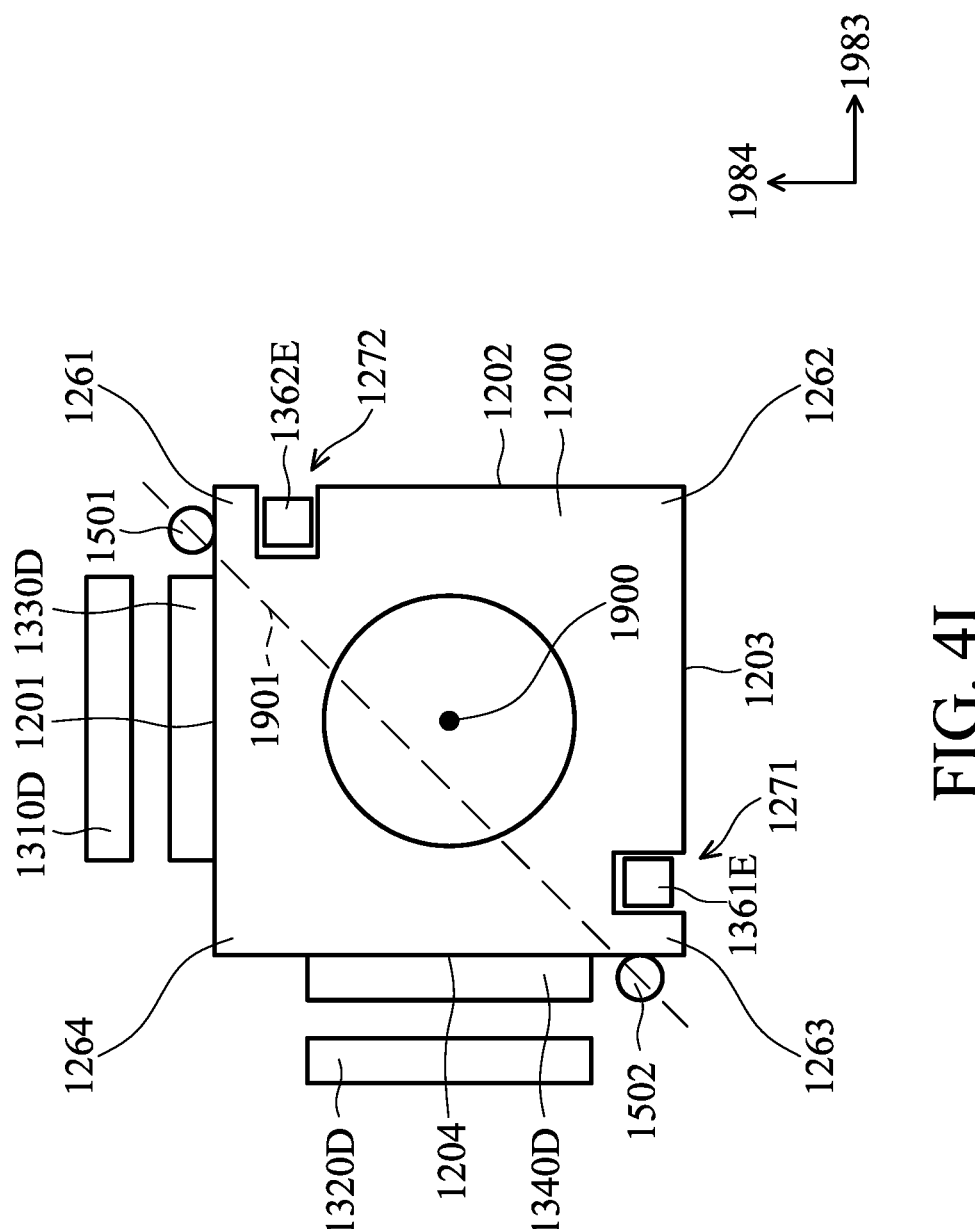

FIG. 4I is a schematic view of a optical element driving mechanism 1009 when viewed along the main axis 1900. As shown in FIG. 4I, the optical element driving mechanism 1009 may be similar to the optical element driving mechanism 1008, and the difference is that the movable portion 1200 of the optical element driving mechanism 1009 may include a first disposing recess 1271 and a second disposing recess 1272, which are respectively recessed from the third movable portion side surface 1203 and the second movable portion side surface 1202, and respectively disposed at the third movable portion corner 1263 and the first movable portion corner 1261. The third magnetic element 1361E may be disposed in the first disposing recess 1271, and the fourth magnetic element 1362E may be disposed in the second disposing recess 1272. Therefore, the third magnetic element 1361E does not protrude from the third movable portion side surface 1203, and the fourth magnetic element 1362E does not protrude from the second movable portion side surface 1202 to reduce the size of the optical element driving mechanism 1009 to achieve miniaturization.

In summary, an optical element driving mechanism is provided in some embodiments of the present disclosure. The optical element driving mechanism includes a movable portion, a fixed portion, and a driving assembly. The movable portion may be used for connecting to an optical element. The movable portion may be used for moving relative to the fixed portion. The driving assembly may be used for driving the movable portion to move relative to the fixed portion. Therefore, auto focus may be performed, the position of the movable portion may be stabilized, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a movable portion used for connecting an optical element and comprising:
     a movable portion main body;
     a first guiding recess formed on the movable portion main body and comprising a first leaning surface and a second leaning surface, wherein a concave portion is formed in the first guiding recess and between the first leaning surface and the second leaning surface; and
     a second guiding recess formed on the movable portion main body, wherein a convex portion is formed in the second guiding recess;
   a fixed portion, wherein the movable portion is movable relative to the fixed portion;
   a driving assembly used for driving the movable portion to move relative to the fixed portion; and
   a guiding assembly used for guiding a moving direction of the movable portion relative to the fixed portion, wherein the guiding assembly comprises:
     a first guiding element disposed on the fixed portion, disposed in the first guiding recess, and in direct contact with the first leaning surface and the second leaning surface; and
     a second guiding element disposed on the fixed portion, disposed in the second guiding recess, and in contact with the convex portion.

2. The optical element driving mechanism as claimed in claim 1,
   wherein:
   the fixed portion comprises a case and a bottom;
   the case and the bottom are arranged along a main axis;
   the main axis extends in a first direction;
   the bottom comprises a first recess, a second recess, a first opening, and a second opening;
   the first guiding element is at least partially disposed in the first recess;
   the second guiding element is at least partially disposed in the second recess;
   the first guiding element passes through the first opening; and
   the second guiding element passes through the second opening.

3. The optical element driving mechanism as claimed in claim 2, wherein:
   the first guiding element is exposed from the bottom when viewed from the first direction;
   the second guiding element is exposed from the bottom when viewed from the first direction;
   the first guiding element is not exposed from the case when viewed from the first direction; and
   the second guiding element is not exposed from the case when viewed from the first direction.

4. The optical element driving mechanism as claimed in claim 3, wherein:

a second direction is opposite from the first direction;

the first guiding element is exposed from the bottom when viewed from the second direction; and the second guiding element is exposed from the bottom when viewed from the second direction.

5. The optical element driving mechanism as claimed in claim 4, wherein:

the first recess comprises a first recess disposing portion and a first recess gap;

the first recess gap is disposed in the first recess disposing portion;

the first guiding element is at least partially disposed in the first recess disposing portion; and the first guiding element is not disposed in the first recess gap.

6. The optical element driving mechanism as claimed in claim 5, wherein:

the second recess comprises a second recess disposing portion and a second recess gap;

the second recess gap is disposed in the second recess disposing portion;

the second guiding element is at least partially disposed in the second recess disposing portion; and the second guiding element is not disposed in the second recess gap.

7. The optical element driving mechanism as claimed in claim 6, wherein:

the first guiding element and the second guiding element are disposed on a virtual plane;

the virtual plane is parallel to the main axis; and the first recess and the second recess are disposed on opposite sides of the virtual plane when viewed along the main axis.

8. The optical element driving mechanism as claimed in claim 7, wherein:

the first guiding recess and the second guiding recess are disposed on opposite sides of the virtual plane.

9. The optical element driving mechanism as claimed in claim 8, wherein:

the first guiding recess has a first segment and a second segment extending in different directions when viewed along the main axis;

the second guiding recess has a third segment and a fourth segment extending in different directions when viewed along the main axis;

the first guiding recess has a first width in a direction that the fourth segment extends;

the second guiding recess has a second width in the direction that the fourth segment extends; and the first width and the second width are different.

10. The optical element driving mechanism as claimed in claim 9, wherein:

the concave portion has a first length along the main axis;

the convex portion has a second length along the main axis; and the first length and the second length are different.

11. The optical element driving mechanism as claimed in claim 10, wherein:

the concave portion is not exposed from the first guiding recess when viewed along the main axis; and the convex portion is exposed from the second guiding recess when viewed along the main axis.

12. The optical element driving mechanism as claimed in claim 11, wherein:

the movable portion further comprises a first stopping portion, a second stopping portion, a third stopping portion, a fourth stopping portion, and a fifth stopping portion;

the first stopping portion extends from the movable portion main body to the case in the second direction;

the second stopping portion extends from the movable portion main body to the case in the second direction;

the third stopping portion extends from the movable portion main body to the case in the second direction;

the fourth stopping portion extends from the movable portion main body to the case in the second direction; and the fifth stopping portion extends from the movable portion main body to the bottom in the first direction.

13. The optical element driving mechanism as claimed in claim 12, wherein:

a first minimum distance is between the first stopping portion and the case in the first direction;

a second minimum distance is between the fifth stopping portion and the bottom in the first direction;

a sum of the first minimum distance and the second minimum distance is a movable range;

the movable range is greater than the second length; and the movable range is less than 2 times of the second length.

14. The optical element driving mechanism as claimed in claim 13, wherein:

the first stopping portion has a first thickness in the main axis;

the fifth stopping portion has a second thickness in the main axis;

the first thickness is greater than 0.5 mm;

the second thickness is greater than 0.5 mm;

the first thickness is less than the movable range; and the second thickness is less than the movable range.

15. The optical element driving mechanism as claimed in claim 14, wherein:

the second width is greater than the first width;

the first length is greater than the second length;

the first stopping portion, the second stopping portion, the third stopping portion, and the fourth stopping portion are arranged relative to a center in a counterclockwise manner when viewed along the main axis, and the center is a point passed through by the main axis;

the first stopping portion and the third stopping portion are rotational symmetrical relative to the center; and the second stopping portion and the fourth stopping portion are rotational symmetrical relative to the center.

16. The optical element driving mechanism as claimed in claim 15, wherein:

the first stopping portion and the second stopping portion have different shapes;

the first stopping portion and the fourth stopping portion have different shapes;

the third stopping portion and the second stopping portion have different shapes; and the third stopping portion and the fourth stopping portion have different shapes.

17. The optical element driving mechanism as claimed in claim 16, wherein:

a distance between the first stopping portion and the first guiding element is less than a distance between the second stopping portion and the first guiding element when viewed along the main axis;

the distance between the first stopping portion and the first guiding element is less than a distance between the fourth stopping portion and the first guiding element when viewed along the main axis;

a distance between the third stopping portion and the second guiding element is less than a distance between the second stopping portion and the second guiding element when viewed along the main axis; and the distance between the third stopping portion and the second guiding element is less than a distance between the fourth stopping portion and the second guiding element when viewed along the main axis.

18. The optical element driving mechanism as claimed in claim 17, further comprising a temperature sensor and a position sensor;

wherein:

the temperature sensor is disposed on the fixed portion;

the temperature sensor is adjacent to the first guiding element or the second guiding element to detect temperature of the first guiding element or the second guiding element; and the position sensor is disposed in a second driving coil and corresponds to a second magnetic element.

19. The optical element driving mechanism as claimed in claim 1, further comprising a first guiding element and a second guiding element disposed on the movable portion;

wherein:

the first guiding element is movably connected to the fixed portion; and the second guiding element is movably connected to the fixed portion.

\* \* \* \* \*